(12) United States Patent
Ko et al.

(10) Patent No.: US 12,727,021 B2
(45) Date of Patent: Sep. 1, 2026

(54) METHOD AND DEVICE FOR SELECTING RESOURCE IN NR V2X

(71) Applicant: LG Electronics Inc., Seoul (KR)

(72) Inventors: Woosuk Ko, Seoul (KR); Seungmin Lee, Seoul (KR); Hanbyul Seo, Seoul (KR)

(73) Assignee: LG Electronics Inc., Seoul (KR)

( * ) Notice: Subject to any disclaimer, the term of this patent is extended or adjusted under 35 U.S.C. 154(b) by 343 days.

(21) Appl. No.: 18/558,972

(22) PCT Filed: May 3, 2022

(86) PCT No.: PCT/KR2022/006355
§ 371 (c)(1),
(2) Date: Nov. 3, 2023

(87) PCT Pub. No.: WO2022/235060
PCT Pub. Date: Nov. 10, 2022

(65) Prior Publication Data

US 2024/0251436 A1 Jul. 25, 2024

Related U.S. Application Data

(60) Provisional application No. 63/230,040, filed on Aug. 5, 2021, provisional application No. 63/185,341, filed on May 6, 2021.

(30) Foreign Application Priority Data

May 4, 2021 (KR) ........................ 10-2021-0058152
Sep. 10, 2021 (KR) ........................ 10-2021-0121234

(51) Int. Cl.
*H04W 72/566* (2023.01)
*H04L 1/1812* (2023.01)
*H04W 72/40* (2023.01)

(52) U.S. Cl.
CPC ......... *H04W 72/566* (2023.01); *H04L 1/1812* (2013.01); *H04W 72/40* (2023.01)

(58) Field of Classification Search
CPC ............... H04W 72/566; H04W 72/40; H04W 74/0816; H04W 72/02; H04W 72/0446;
(Continued)

(56) References Cited

U.S. PATENT DOCUMENTS

2020/0351857 A1* 11/2020 Bharadwaj ............ H04L 5/0051
2022/0061095 A1* 2/2022 Xue ...................... H04W 80/02
(Continued)

FOREIGN PATENT DOCUMENTS

WO 2022/031921 A1 2/2022

OTHER PUBLICATIONS

62706501_Specification_Drawings_Aug. 20, 2020 (Year: 2020).*
(Continued)

*Primary Examiner* — Rushil P. Sampat
(74) *Attorney, Agent, or Firm* — Fish & Richardson P.C.

(57) ABSTRACT

A method by which a first device performs wireless communication and a device for supporting same. The method includes acquiring a media access control (MAC) protocol data unit (PDU); determining a priority value related to the MAC PDU; triggering resource selection in a slot; determining a plurality of candidate slots within a selection window determined on the basis of the slot; monitoring a plurality of slots related to the plurality of candidate slots; determining a plurality of candidate resources within the plurality of candidate slots on the basis of the monitoring; and selecting a plurality of sidelink (SL) resources from among the plurality of candidate resources, wherein the time interval between the plurality of SL resources can be determined on the basis of the priority value related to the MAC PDU.

18 Claims, 17 Drawing Sheets

(58) Field of Classification Search
CPC . H04W 74/002; H04W 74/008; H04W 80/02; H04W 74/0808; H04W 76/14; H04L 1/1812
See application file for complete search history.

(56) References Cited

U.S. PATENT DOCUMENTS

| | | | | |
|---|---|---|---|---|
| 2023/0084524 | A1* | 3/2023 | Zhang | H04L 5/0082 |
| 2023/0131882 | A1* | 4/2023 | Lin | H04W 72/02 370/329 |
| 2024/0031997 | A1* | 1/2024 | Lin | H04W 4/40 |

OTHER PUBLICATIONS

Extended European Search Report in European Appln. No. 22799103.1, mailed on Mar. 10, 2025, 11 pages.
InterDigital, Inc., "Sidelink resource allocation for power saving," R1-2103537, 3GPP TSG RAN WG1 #104-e, e-Meeting, Apr. 12-20, 2021, 9 pages.
LG Electronics, "Discussion on resource allocation for power saving," R1-2100517, 3Gpp TSG RAN WG1 Meeting #104-e, e-Meeting, Jan. 25-Feb. 5, 2021, 20 pages.

* cited by examiner

FIG. 2

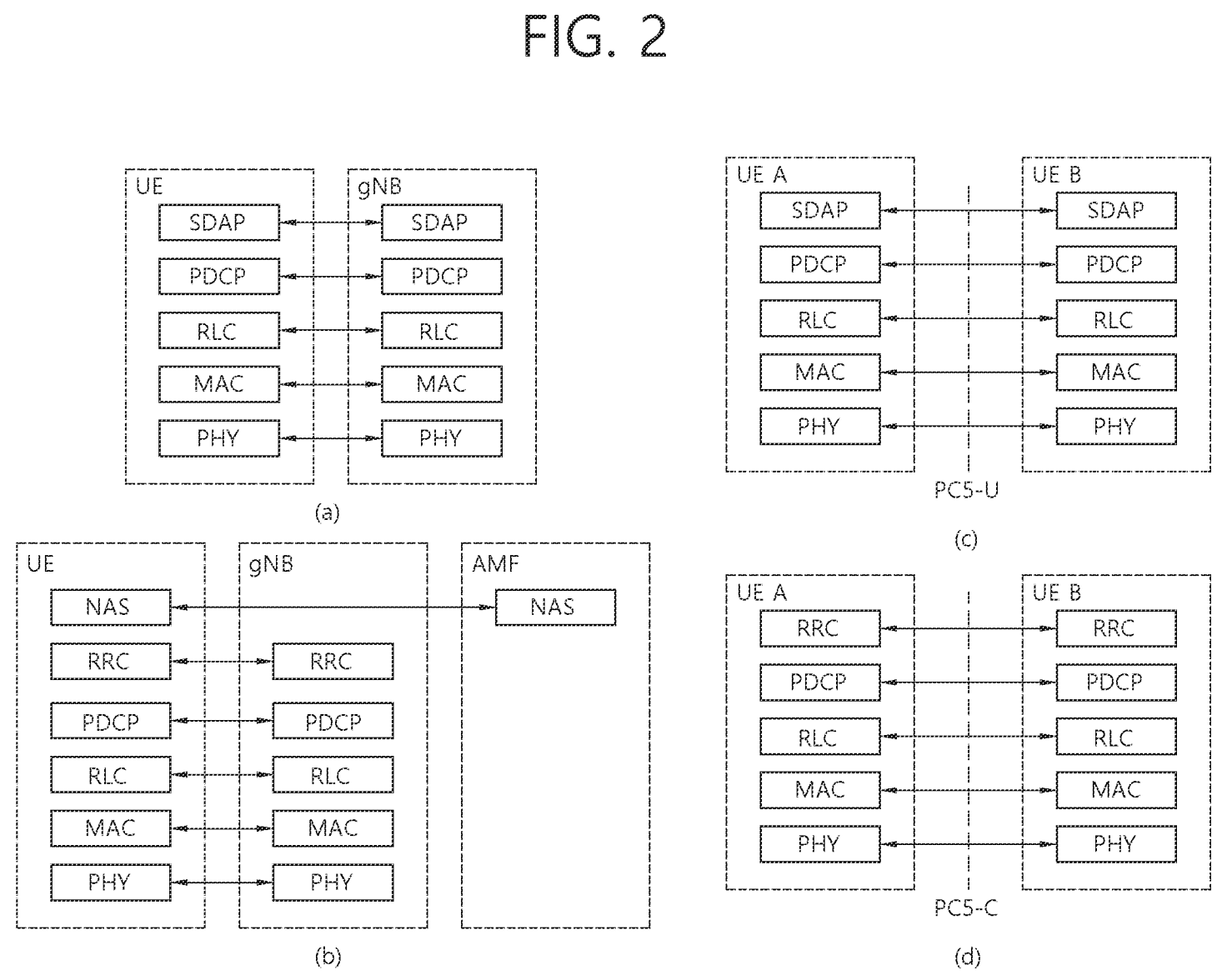

UE
SDAP
PDCP
RLC
MAC
PHY
gNB
SDAP
PDCP
RLC
MAC
PHY
(a)

UE
NAS
RRC
PDCP
RLC
MAC
PHY
gNB
RRC
PDCP
RLC
MAC
PHY
AMF
NAS
(b)

UE A
SDAP
PDCP
RLC
MAC
PHY
UE B
SDAP
PDCP
RLC
MAC
PHY
PC5-U
(c)

UE A
RRC
PDCP
RLC
MAC
PHY
UE B
RRC
PDCP
RLC
MAC
PHY
PC5-C
(d)

200
Second Device
202
Processor(s)
Memory(s)
204
Transceiver(s)
206
208
108
100
First Device
Transceiver(s)
106
Processor(s)
Memory(s)
104
102

METHOD AND DEVICE FOR SELECTING RESOURCE IN NR V2X

CROSS-REFERENCE TO RELATED APPLICATIONS

This application is the National Stage filing under 35 U.S.C. 371 of International Application No. PCT/KR2022/006355 filed on May 3, 2022, which claims the benefit of Korean Patent Application No. 10-2021-0058152 filed on May 4, 2021, U.S. Provisional Application No. 63/185,341 filed on May 6, 2021, U.S. Provisional Application No. 63/230,040 filed on Aug. 5, 2021, and Korean Patent Application No. 10-2021-0121234 filed on Sep. 10, 2021, which are all hereby incorporated by reference herein in their entirety.

TECHNICAL FIELD

This disclosure relates to a wireless communication system.

BACKGROUND

Sidelink (SL) communication is a communication scheme in which a direct link is established between User Equipments (UEs) and the UEs exchange voice and data directly with each other without intervention of a base station. SL communication is under consideration as a solution to the overhead of a base station caused by rapidly increasing data traffic. Vehicle-to-everything (V2X) refers to a communication technology through which a vehicle exchanges information with another vehicle, a pedestrian, an object having an infrastructure (or infra) established therein, and so on. The V2X may be divided into 4 types, such as vehicle-to-vehicle (V2V), vehicle-to-infrastructure (V2I), vehicle-to-network (V2N), and vehicle-to-pedestrian (V2P). The V2X communication may be provided via a PC5 interface and/or Uu interface.

Meanwhile, as a wider range of communication devices require larger communication capacities, the need for mobile broadband communication that is more enhanced than the existing Radio Access Technology (RAT) is rising. Accordingly, discussions are made on services and user equipment (UE) that are sensitive to reliability and latency. And, a next generation radio access technology that is based on the enhanced mobile broadband communication, massive Machine Type Communication (MTC), Ultra-Reliable and Low Latency Communication (URLLC), and so on, may be referred to as a new radio access technology (RAT) or new radio (NR). Herein, the NR may also support vehicle-to-everything (V2X) communication.

SUMMARY

Meanwhile, if a resource reserved by a UE-A to transmit a media access control (MAC) protocol data unit (PDU) with a high priority (i.e., small priority value) and a resource reserved by a UE-B to transmit a MAC PDU with a low priority (i.e., large priority value) overlap in a slot #K, and if the UE-B performs resource re-evaluation or pre-emption checking for the resource reserved on the slot #K, the UE-B may need to drop the resource reserved on the slot #K and select another resource. In this case, it may be difficult for the UE-B to secure another resource within packet delay budget (PDB) related to the MAC PDU it intends to transmit due to resources already reserved by the UE-A, which may lead to transmission failure of the UE-B.

In an embodiment, provided is a method for performing wireless communication by a first device. The method may comprise: obtaining a media access control (MAC) protocol data unit (PDU); determining a priority value related to the MAC PDU; triggering resource selection in a slot; determining a plurality of candidate slots within a selection window determined based on the slot; performing monitoring for a plurality of slots related to the plurality of candidate slots, determining a plurality of candidate resources within the plurality of candidate slots based on the monitoring; and selecting a plurality of sidelink (SL) resources among the plurality of candidate resources, wherein a time interval between the plurality of SL resources is determined based on the priority value related to the MAC PDU.

In an embodiment, provided is a first device adapted to perform wireless communication. The first device may comprise: one or more memories storing instructions: one or more transceivers; and one or more processors connected to the one or more memories and the one or more transceivers. The one or more processors may execute the instructions to: obtain a media access control (MAC) protocol data unit (PDU); determine a priority value related to the MAC PDU; trigger resource selection in a slot; determine a plurality of candidate slots within a selection window determined based on the slot; perform monitoring for a plurality of slots related to the plurality of candidate slots; determine a plurality of candidate resources within the plurality of candidate slots based on the monitoring; and select a plurality of sidelink (SL) resources among the plurality of candidate resources, wherein a time interval between the plurality of SL resources is determined based on the priority value related to the MAC PDU.

In an embodiment, provided is an apparatus adapted to control a first user equipment (UE). The apparatus may comprise: one or more processors; and one or more memories operably connected to the one or more processors and storing instructions. The one or more processors may execute the instructions to: obtain a media access control (MAC) protocol data unit (PDU); determine a priority value related to the MAC PDU; trigger resource selection in a slot; determine a plurality of candidate slots within a selection window determined based on the slot; perform monitoring for a plurality of slots related to the plurality of candidate slots; determine a plurality of candidate resources within the plurality of candidate slots based on the monitoring; and select a plurality of sidelink (SL) resources among the plurality of candidate resources, wherein a time interval between the plurality of SL resources is determined based on the priority value related to the MAC PDU.

The reliability of SL transmission with relatively low priority can be secured.

BRIEF DESCRIPTION OF THE DRAWINGS

FIG. 2 shows a radio protocol architecture, based on an embodiment of the present disclosure.

DETAILED DESCRIPTION

Figure 1:
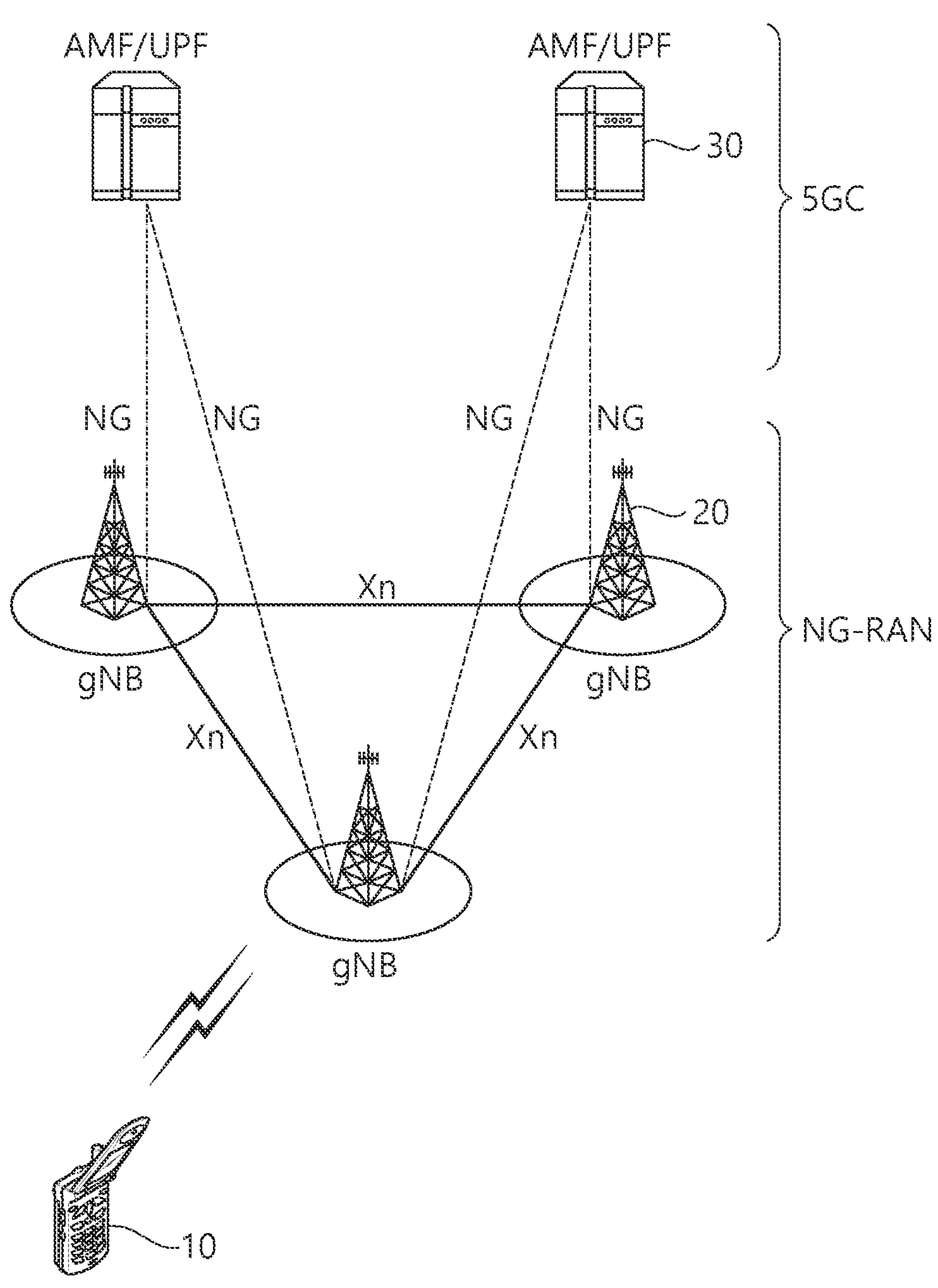
FIG. 1 shows a structure of an NR system, based on an embodiment of the present disclosure.

In the present disclosure, "A or B" may mean "only A", "only B" or "both A and B." In other words, in the present disclosure, "A or B" may be interpreted as "A and/or B". For example, in the present disclosure, "A, B. or C" may mean "only A", "only B", "only C", or "any combination of A, B, C".

A slash (/) or comma used in the present disclosure may mean "and/or". For example, "A/B" may mean "A and/or B". Accordingly, "A/B" may mean "only A", "only B", or "both A and B". For example, "A, B, C" may mean "A, B, or C".

In the present disclosure, "at least one of A and B" may mean "only A", "only B", or "both A and B". In addition, in the present disclosure, the expression "at least one of A or B" or "at least one of A and/or B" may be interpreted as "at least one of A and B".

In addition, in the present disclosure, "at least one of A, B, and C" may mean "only A", "only B", "only C", or "any combination of A, B, and C". In addition, "at least one of A, B, or C" or "at least one of A, B, and/or C" may mean "at least one of A, B, and C".

In addition, a parenthesis used in the present disclosure may mean "for example". Specifically, when indicated as "control information (PDCCH)", it may mean that "PDCCH" is proposed as an example of the "control information". In other words, the "control information" of the present disclosure is not limited to "PDCCH", and "PDCCH" may be proposed as an example of the "control information". In addition, when indicated as "control information (i.e., PDCCH)", it may also mean that "PDCCH" is proposed as an example of the "control information".

In the following description, 'when, if, or in case of' may be replaced with 'based on'.

A technical feature described individually in one figure in the present disclosure may be individually implemented, or may be simultaneously implemented.

In the present disclosure, a higher layer parameter may be a parameter which is configured, pre-configured or pre-defined for a UE. For example, a base station or a network may transmit the higher layer parameter to the UE. For example, the higher layer parameter may be transmitted through radio resource control (RRC) signaling or medium access control (MAC) signaling.

The technology described below may be used in various wireless communication systems such as code division multiple access (CDMA), frequency division multiple access (FDMA), time division multiple access (TDMA), orthogonal frequency division multiple access (OFDMA), single carrier frequency division multiple access (SC-FDMA), and so on. The CDMA may be implemented with a radio technology, such as universal terrestrial radio access (UTRA) or CDMA-2000. The TDMA may be implemented with a radio technology, such as global system for mobile communications (GSM)/general packet ratio service (GPRS)/enhanced data rate for GSM evolution (EDGE). The OFDMA may be implemented with a radio technology, such as institute of electrical and electronics engineers (IEEE) 802.11 (Wi-Fi). IEEE 802.16 (WiMAX), IEEE 802.20, evolved UTRA (E-UTRA), and so on. IEEE 802.16m is an evolved version of IEEE 802.16e and provides backward compatibility with a system based on the IEEE 802.16e. The UTRA is part of a universal mobile telecommunication system (UMTS). 3rd generation partnership project (3GPP) long term evolution (LTE) is part of an evolved UMTS (E-UMTS) using the E-UTRA. The 3GPP LTE uses the OFDMA in a downlink and uses the SC-FDMA in an uplink. LTE-advanced (LTE-A) is an evolution of the LTE.

5G NR is a successive technology of LTE-A corresponding to a new Clean-slate type mobile communication system having the characteristics of high performance, low latency, high availability, and so on. 5G NR may use resources of all spectrum available for usage including low frequency bands of less than 1 GHz, middle frequency bands ranging from 1 GHz to 10 GHz, high frequency (millimeter waves) of 24 GHz or more, and so on.

For clarity in the description, the following description will mostly focus on 5G NR. However, technical features according to an embodiment of the present disclosure will not be limited only to this.

FIG. 1 shows a structure of an NR system, based on an embodiment of the present disclosure. The embodiment of FIG. 1 may be combined with various embodiments of the present disclosure.

Referring to FIG. 1, a next generation-radio access network (NG-RAN) may include a BS 20 providing a UE 10 with a user plane and control plane protocol termination. For example, the BS 20 may include a next generation-Node B (gNB) and/or an evolved-NodeB (eNB). For example, the UE 10 may be fixed or mobile and may be referred to as other terms, such as a mobile station (MS), a user terminal (UT), a subscriber station (SS), a mobile terminal (MT), wireless device, and so on. For example, the BS may be referred to as a fixed station which communicates with the UE 10 and may be referred to as other terms, such as a base transceiver system (BTS), an access point (AP), and so on.

The embodiment of FIG. 1 exemplifies a case where only the gNB is included. The BSs 20 may be connected to one another via Xn interface. The BS 20 may be connected to one another via 5th generation (5G) core network (5GC) and NG interface. More specifically, the BSs 20 may be connected to an access and mobility management function (AMF) 30 via NG-C interface, and may be connected to a user plane function (UPF) 30 via NG-U interface.

Layers of a radio interface protocol between the UE and the network can be classified into a first layer (layer 1, L1), a second layer (layer 2, L2), and a third layer (layer 3, L3) based on the lower three layers of the open system interconnection (OSI) model that is well-known in the communication system. Among them, a physical (PHY) layer belonging to the first layer provides an information transfer service by using a physical channel, and a radio resource control (RRC) layer belonging to the third layer serves to control a radio resource between the UE and the network. For this, the RRC layer exchanges an RRC message between the UE and the BS.

FIG. 2 shows a radio protocol architecture, based on an embodiment of the present disclosure. The embodiment of FIG. 2 may be combined with various embodiments of the present disclosure. Specifically, (a) of FIG. 2 shows a radio protocol stack of a user plane for Uu communication, and (b) of FIG. 2 shows a radio protocol stack of a control plane for Uu communication, (c) of FIG. 2 shows a radio protocol stack of a user plane for SL communication, and (d) of FIG. 2 shows a radio protocol stack of a control plane for SL communication.

Referring to FIG. 2, a physical layer provides an upper layer with an information transfer service through a physical channel. The physical layer is connected to a medium access control (MAC) layer which is an upper layer of the physical layer through a transport channel Data is transferred between the MAC layer and the physical layer through the transport channel. The transport channel is classified according to how and with what characteristics data is transmitted through a radio interface.

Between different physical layers. i.e., a physical layer of a transmitter and a physical layer of a receiver, data are transferred through the physical channel. The physical channel is modulated using an orthogonal frequency division multiplexing (OFDM) scheme, and utilizes time and frequency as a radio resource.

The MAC layer provides services to a radio link control (RLC) layer, which is a higher layer of the MAC layer, via a logical channel. The MAC layer provides a function of mapping multiple logical channels to multiple transport channels. The MAC layer also provides a function of logical channel multiplexing by mapping multiple logical channels to a single transport channel. The MAC layer provides data transfer services over logical channels.

The RLC layer performs concatenation, segmentation, and reassembly of Radio Link Control Service Data Unit (RLC SDU). In order to ensure diverse quality of service (QoS) required by a radio bearer (RB), the RLC layer provides three types of operation modes, i.e., a transparent mode (TM), an unacknowledged mode (UM), and an acknowledged mode (AM). An AM RLC provides error correction through an automatic repeat request (ARQ).

A radio resource control (RRC) layer is defined only in the control plane. The RRC layer serves to control the logical channel, the transport channel, and the physical channel in association with configuration, reconfiguration and release of RBs. The RB is a logical path provided by the first layer (i.e., the physical layer or the PHY layer) and the second layer (i.e., a MAC layer, an RLC layer, a packet data convergence protocol (PDCP) layer, and a service data adaptation protocol (SDAP) layer) for data delivery between the UE and the network.

Functions of a packet data convergence protocol (PDCP) layer in the user plane include user data delivery, header compression, and ciphering. Functions of a PDCP layer in the control plane include control-plane data delivery and ciphering/integrity protection.

A service data adaptation protocol (SDAP) layer is defined only in a user plane. The SDAP layer performs mapping between a Quality of Service (QoS) flow and a data radio bearer (DRB) and QoS flow ID (QFI) marking in both DL and UL packets.

The configuration of the RB implies a process for specifying a radio protocol layer and channel properties to provide a particular service and for determining respective detailed parameters and operations. The RB can be classified into two types, i.e., a signaling RB (SRB) and a data RB (DRB). The SRB is used as a path for transmitting an RRC message in the control plane. The DRB is used as a path for transmitting user data in the user plane.

When an RRC connection is established between an RRC layer of the UE and an RRC layer of the E-UTRAN, the UE is in an RRC_CONNECTED state, and, otherwise, the UE may be in an RRC_IDLE state. In case of the NR, an RRC_INACTIVE state is additionally defined, and a UE being in the RRC_INACTIVE state may maintain its connection with a core network whereas its connection with the BS is released.

Data is transmitted from the network to the UE through a downlink transport channel. Examples of the downlink transport channel include a broadcast channel (BCH) for transmitting system information and a downlink-shared channel (SCH) for transmitting user traffic or control messages. Traffic of downlink multicast or broadcast services or the control messages can be transmitted on the downlink-SCH or an additional downlink multicast channel (MCH). Data is transmitted from the UE to the network through an uplink transport channel. Examples of the uplink transport channel include a random access channel (RACH) for transmitting an initial control message and an uplink SCH for transmitting user traffic or control messages.

Examples of logical channels belonging to a higher channel of the transport channel and mapped onto the transport channels include a broadcast channel (BCCH), a paging control channel (PCCH), a common control channel (CCCH), a multicast control channel (MCCH), a multicast traffic channel (MTCH), etc.

Figure 3:
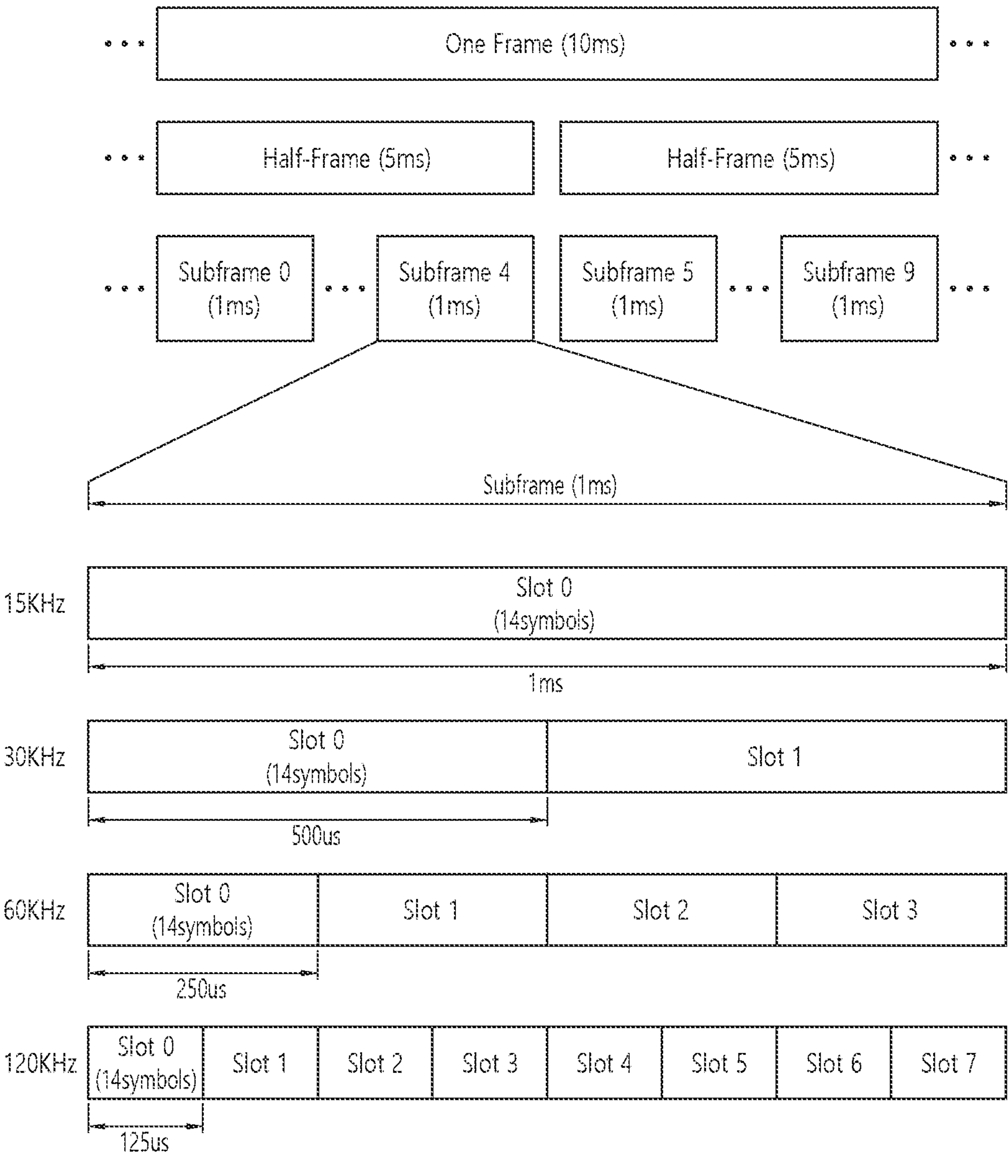
FIG. 3 shows a structure of a radio frame of an NR, based on an embodiment of the present disclosure.

FIG. 3 shows a structure of a radio frame of an NR, based on an embodiment of the present disclosure. The embodiment of FIG. 3 may be combined with various embodiments of the present disclosure.

Referring to FIG. 3, in the NR, a radio frame may be used for performing uplink and downlink transmission. A radio frame has a length of 10 ms and may be defined to be configured of two half-frames (HFs). Ahalf-frame may include five 1 ms subframes (SFs). A subframe (SF) may be divided into one or more slots, and the number of slots within a subframe may be determined based on subcarrier spacing (SCS). Each slot may include 12 or 14 OFDM(A) symbols according to a cyclic prefix (CP).

In case of using a normal CP, each slot may include 14 symbols. In case of using an extended CP, each slot may include 12 symbols. Herein, a symbol may include an OFDM symbol (or CP-OFDM symbol) and a Single Carrier- FDMA (SC-FDMA) symbol (or Discrete Fourier Transform-spread-OFDM (DFT-s-OFDM) symbol).

Table 1 shown below represents an example of a number of symbols per slot $$(N_{symb}^{slot}),$$

a number slots per frame $$(N_{slot}^{frame,u}),$$

and a number of slots per subframe $$(N_{slot}^{subframe,u})$$

based on an SCS configuration (u), in a case where a normal CP is used.

TABLE 1

| SCS (15 * $2^u$) | $N_{symb}^{slot}$ | $N_{slot}^{frame,u}$ | $N_{slot}^{subframe,u}$ |
|---|---|---|---|
| 15 KHz (u = 0) | 14 | 10 | 1 |
| 30 KHz (u = 1) | 14 | 20 | 2 |
| 60 KHz (u = 2) | 14 | 40 | 4 |
| 120 KHz (u = 3) | 14 | 80 | 8 |
| 240 KHz (u = 4) | 14 | 160 | 16 |

Table 2 shows an example of a number of symbols per slot, a number of slots per frame, and a number of slots per subframe based on the SCS, in a case where an extended CP is used.

TABLE 2

| SCS (15 * $2^u$) | $N_{symb}^{slot}$ | $N_{symb}^{slot}$ | $N_{slot}^{subframe,u}$ |
|---|---|---|---|
| 60 KHz (u = 2) | 12 | 40 | 4 |

In an NR system, OFDM(A) numerologies (e.g., SCS, CP length, and so on) between multiple cells being integrate to one UE may be differently configured. Accordingly, a (absolute time) duration (or section) of a time resource (e.g., subframe, slot or TTI) (collectively referred to as a time unit (TU) for simplicity) being configured of the same number of symbols may be differently configured in the integrated cells.

In the NR, multiple numerologies or SCSs for supporting diverse 5G services may be supported. For example, in case an SCS is 15 kHz, a wide area of the conventional cellular bands may be supported, and, in case an SCS is 30 kHz/60 kHz a dense-urban, lower latency, wider carrier bandwidth may be supported. In case the SCS is 60 kHz or higher, a bandwidth that is greater than 24.25 GHz may be used in order to overcome phase noise.

An NR frequency band may be defined as two different types of frequency ranges. The two different types of frequency ranges may be FR1 and FR2. The values of the frequency ranges may be changed (or varied), and, for example, the two different types of frequency ranges may be as shown below in Table 3. Among the frequency ranges that are used in an NR system, FR1 may mean a "sub 6 GHz range", and FR2 may mean an "above 6 GHz range" and may also be referred to as a millimeter wave (mmW).

TABLE 3

| Frequency Range designation | Corresponding frequency range | Subcarrier Spacing (SCS) |
|---|---|---|
| FR1 | 450 MHz-6000 MHz | 15, 30, 60 kHz |
| FR2 | 24250 MHz-52600 MHz | 60, 120, 240 kHz |

As described above, the values of the frequency ranges in the NR system may be changed (or varied). For example, as shown below in Table 4, FR1 may include a band within a range of 410 MHz to 7125 MHz. More specifically, FR1 may include a frequency band of 6 GHz (or 5850, 5900, 5925 MHz, and so on) and higher. For example, a frequency band of 6 GHz (or 5850, 5900, 5925 MHz, and so on) and higher being included in FR1 mat include an unlicensed band. The unlicensed band may be used for diverse purposes, e.g., the unlicensed band for vehicle-specific communication (e.g., automated driving).

TABLE 4

| Frequency Range designation | Corresponding frequency range | Subcarrier Spacing (SCS) |
|---|---|---|
| FR1 | 410 MHz-7125 MHz | 15, 30, 60 kHz |
| FR2 | 24250 MHz-52600 MHz | 60, 120, 240 kHz |

Figure 4:
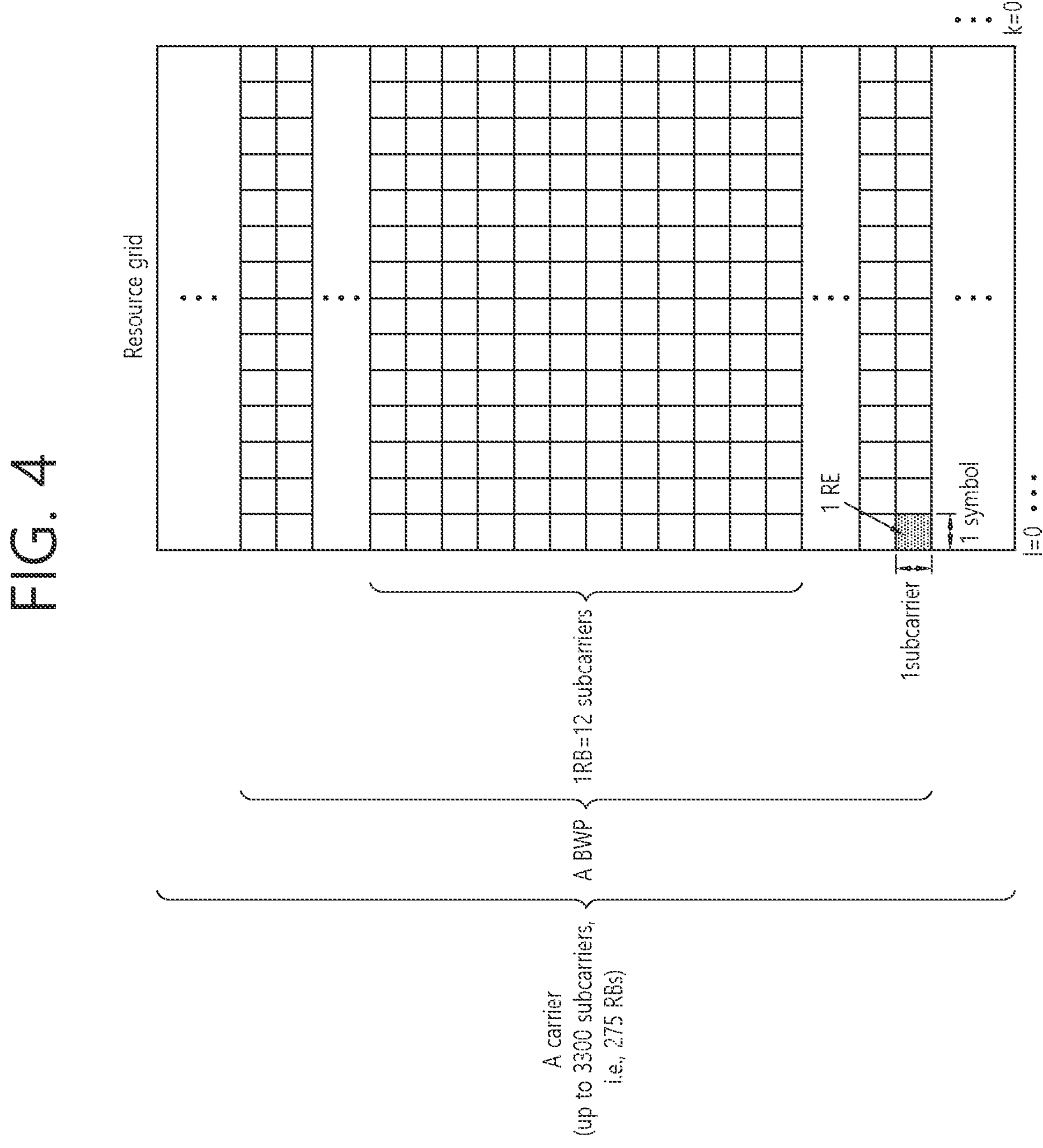
FIG. 4 shows a structure of a slot of an NR frame, based on an embodiment of the present disclosure.

FIG. 4 shows a structure of a slot of an NR frame, based on an embodiment of the present disclosure. The embodiment of FIG. 4 may be combined with various embodiments of the present disclosure.

Referring to FIG. 4, a slot includes a plurality of symbols in a time domain. For example, in case of a normal CP, one slot may include 14 symbols. However, in case of an extended CP, one slot may include 12 symbols. Alternatively, in case of a normal CP, one slot may include 7 symbols. However, in case of an extended CP, one slot may include 6 symbols.

A carrier includes a plurality of subcarriers in a frequency domain. A Resource Block (RB) may be defined as a plurality of consecutive subcarriers (e.g., 12 subcarriers) in the frequency domain. A Bandwidth Part (BWP) may be defined as a plurality of consecutive (Physical) Resource Blocks ((P)RBs) in the frequency domain, and the BWP may correspond to one numerology (e.g., SCS, CP length, and so on). A carrier may include a maximum of N number BWPs (e.g., 5 BWPs). Data communication may be performed via an activated BWP. Each element may be referred to as a Resource Element (RE) within a resource grid and one complex symbol may be mapped to each element.

Hereinafter, a bandwidth part (BWP) and a carrier will be described.

The BWP may be a set of consecutive physical resource blocks (PRBs) in a given numerology. The PRB may be selected from consecutive sub-sets of common resource blocks (CRBs) for the given numerology on a given carrier For example, the BWP may be at least any one of an active BWP, an initial BWP, and/or a default BWP. For example, the UE may not monitor downlink radio link quality in a DL BWP other than an active DL BWP on a primary cell (PCell). For example, the UE may not receive PDCCH, physical downlink shared channel (PDSCH), or channel state information-reference signal (CSI-RS) (excluding RRM) outside the active DL BWP. For example, the UE may not trigger a channel state information (CSI) report for the inactive DL BWP. For example, the UE may not transmit physical uplink control channel (PUCCH) or physical uplink shared channel (PUSCH) outside an active UL BWP. For example, in a downlink case, the initial BWP may be given as a consecutive RB set for a remaining minimum system information (RMSI) control resource set (CORESET) (configured by physical broadcast channel (PBCH)). For example, in an uplink case, the initial BWP may be given by system information block (SIB) for a random access procedure. For example, the default BWP may be configured by a higher layer. For example, an initial value of the default BWP may be an initial DL BWP. For energy saving, if the UE fails to detect downlink control information (DCI) during a specific period, the UE may switch the active BWP of the UE to the default BWP.

Meanwhile, the BWP may be defined for SL. The same SL BWP may be used in transmission and reception. For example, a transmitting UE may transmit a SL channel or a SL signal on a specific BWP, and a receiving UE may receive the SL channel or the SL signal on the specific BWP. In a licensed carrier, the SL BWP may be defined separately from a Uu BWP, and the SL BWP may have configuration signaling separate from the Uu BWP. For example, the UE may receive a configuration for the SL BWP from the BS/network. For example, the UE may receive a configuration for the Uu BWP from the BS/network. The SL BWP may be (pre-)configured in a carrier with respect to an out-of-coverage NR V2X UE and an RRC_IDLE UE. For the UE in the RRC_CONNECTED mode, at least one SL BWP may be activated in the carrier.

Figure 5:
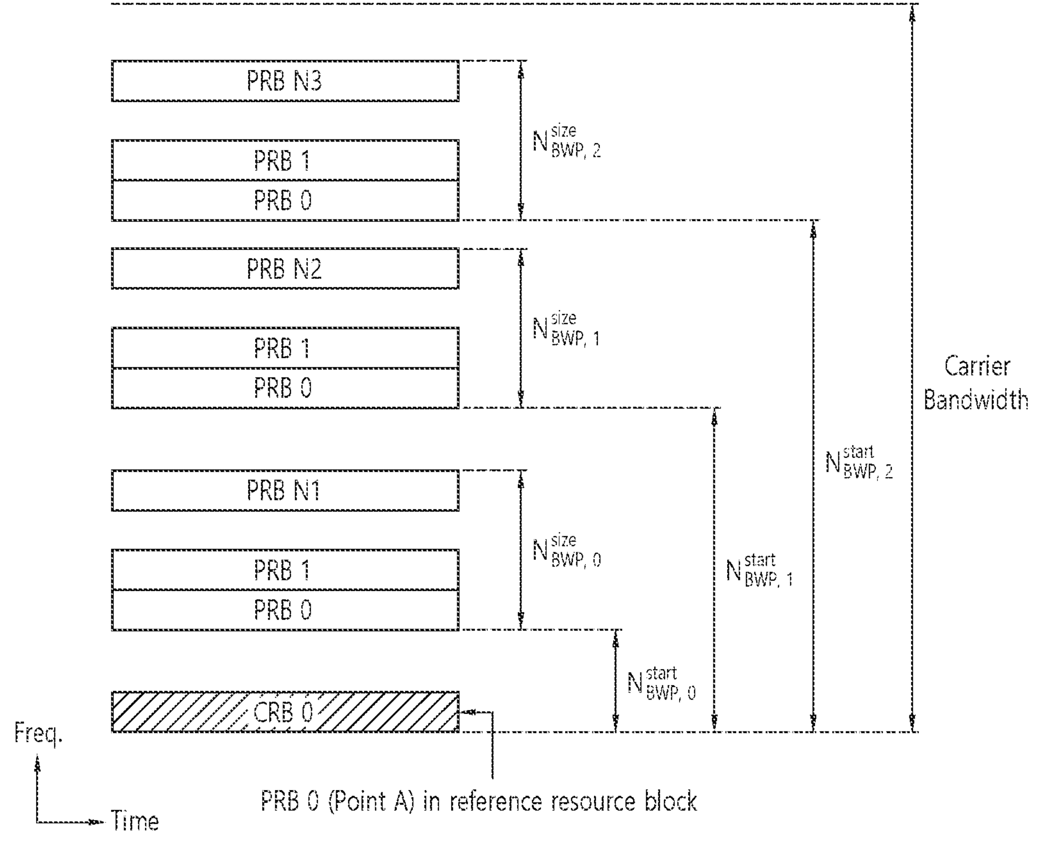
FIG. 5 shows an example of a BWP, based on an embodiment of the present disclosure.

FIG. 5 shows an example of a BWP, based on an embodiment of the present disclosure. The embodiment of FIG. 5 may be combined with various embodiments of the present disclosure. It is assumed in the embodiment of FIG. 5 that the number of BWPs is 3.

Referring to FIG. 5, a common resource block (CRB) may be a carrier resource block numbered from one end of a carrier band to the other end thereof. In addition, the PRB may be a resource block numbered within each BWP. A point A may indicate a common reference point for a resource block grid.

The BWP may be configured by a point A, an offset $N^{start}_{BWP}$ from the point A, and a bandwidth $N^{size}_{BWP}$. For example, the point A may be an external reference point of a PRB of a carrier in which a subcarrier 0 of all numerologies (e.g., all numerologies supported by a network on that carrier) is aligned. For example, the offset may be a PRB interval between a lowest subcarrier and the point A in a given numerology. For example, the bandwidth may be the number of PRBs in the given numerology.

Hereinafter, V2X or SL communication will be described.

A sidelink synchronization signal (SLSS) may include a primary sidelink synchronization signal (PSSS) and a secondary sidelink synchronization signal (SSSS), as a SL-specific sequence. The PSSS may be referred to as a sidelink primary synchronization signal (S-PSS), and the SSSS may be referred to as a sidelink secondary synchronization signal (S-SSS). For example, length-127 M-sequences may be used for the S-PSS, and length-127 gold sequences may be used for the S-SSS. For example, a UE may use the S-PSS for initial signal detection and for synchronization acquisition. For example, the UE may use the S-PSS and the S-SSS for acquisition of detailed synchronization and for detection of a synchronization signal ID.

A physical sidelink broadcast channel (PSBCH) may be a (broadcast) channel for transmitting default (system) information which must be first known by the UE before SL signal transmission/reception. For example, the default information may be information related to SLSS, a duplex mode (DM), a time division duplex (TDD) uplink/downlink (UL/DL) configuration, information related to a resource pool, a type of an application related to the SLSS, a subframe offset, broadcast information, or the like. For example, for evaluation of PSBCH performance, in NR V2X, a payload size of the PSBCH may be 56 bits including 24-bit cyclic redundancy check (CRC).

The S-PSS, the S-SSS, and the PSBCH may be included in a block format (e.g., SL synchronization signal (SS)/PSBCH block, hereinafter, sidelink-synchronization signal block (S-SSB)) supporting periodical transmission. The S-SSB may have the same numerology (i.e., SCS and CP length) as a physical sidelink control channel (PSCCH)/physical sidelink shared channel (PSSCH) in a carrier, and a transmission bandwidth may exist within a (pre-)configured sidelink (SL) BWP. For example, the S-SSB may have a bandwidth of 11 resource blocks (RBs). For example, the PSBCH may exist across 11 RBs. In addition, a frequency position of the S-SSB may be (pre-)configured. Accordingly, the UE does not have to perform hypothesis detection at frequency to discover the S-SSB in the carrier.

Figure 6:
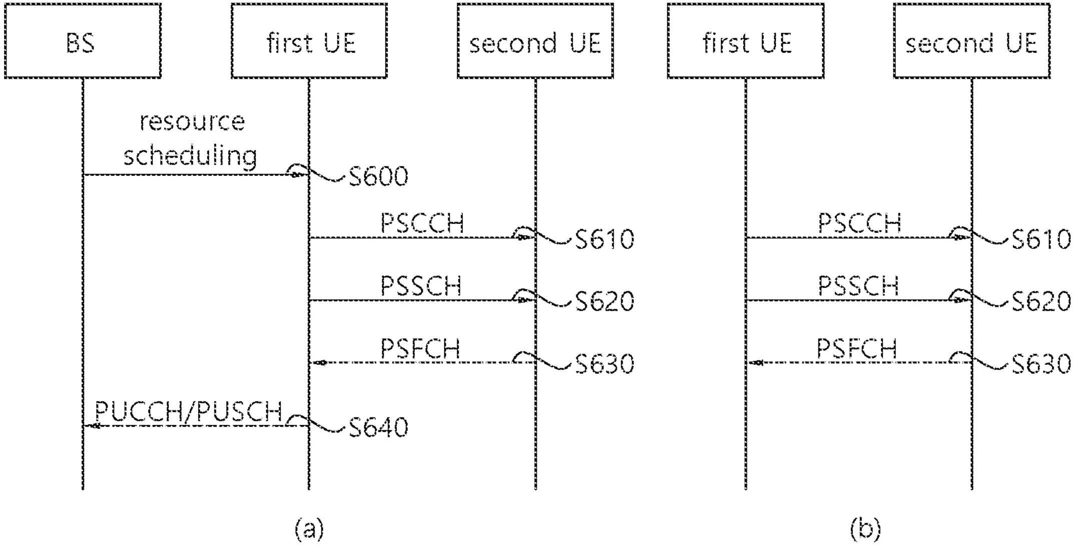
FIG. 6 shows a procedure of performing V2X or SL communication by a UE based on a transmission mode, based on an embodiment of the present disclosure.

FIG. 6 shows a procedure of performing V2X or SL communication by a UE based on a transmission mode, based on an embodiment of the present disclosure. The embodiment of FIG. 6 may be combined with various embodiments of the present disclosure. In various embodiments of the present disclosure, the transmission mode may be called a mode or a resource allocation mode. Hereinafter, for convenience of explanation, in LTE, the transmission mode may be called an LTE transmission mode. In NR, the transmission mode may be called an NR resource allocation mode.

For example, (a) of FIG. 6 shows a UE operation related to an LTE transmission mode 1 or an LTE transmission mode 3. Alternatively, for example, (a) of FIG. 6 shows a UE operation related to an NR resource allocation mode 1. For example, the LTE transmission mode 1 may be applied to general SL communication, and the LTE transmission mode 3 may be applied to V2X communication.

For example, (b) of FIG. 6 shows a UE operation related to an LTE transmission mode 2 or an LTE transmission mode 4. Alternatively, for example, (b) of FIG. 6 shows a UE operation related to an NR resource allocation mode 2.

Referring to (a) of FIG. 6, in the LTE transmission mode 1, the LTE transmission mode 3, or the NR resource allocation mode 1, a base station may schedule SL resource(s) to be used by a UE for SL transmission. For example, in step S600, a base station may transmit information related to SL resource(s) and/or information related to UL resource(s) to a first UE. For example, the UL resource(s) may include PUCCH resource(s) and/or PUSCH resource(s). For example, the UL resource(s) may be resource(s) for reporting SL HARQ feedback to the base station.

For example, the first UE may receive information related to dynamic grant (DG) resource(s) and/or information related to configured grant (CG) resource(s) from the base station. For example, the CG resource(s) may include CG type 1 resource(s) or CG type 2 resource(s). In the present disclosure, the DG resource(s) may be resource(s) configured/allocated by the base station to the first UE through a downlink control information (DCI). In the present disclosure, the CG resource(s) may be (periodic) resource(s)

configured/allocated by the base station to the first UE through a DCI and/or an RRC message. For example, in the case of the CG type 1 resource(s), the base station may transmit an RRC message including information related to CG resource(s) to the first UE. For example, in the case of the CG type 2 resource(s), the base station may transmit an RRC message including information related to CG resource (s) to the first UE, and the base station may transmit a DCI related to activation or release of the CG resource(s) to the first UE.

In step S610, the first UE may transmit a PSCCH (e.g., sidelink control information (SCI) or $1^{st}$-stage SCI) to a second UE based on the resource scheduling. In step S620, the first UE may transmit a PSSCH (e.g., $2^{nd}$-stage SCI, MAC PDU, data, etc.) related to the PSCCH to the second UE. In step S630, the first UE may receive a PSFCH related to the PSCCH/PSSCH from the second UE. For example, HARQ feedback information (e.g., NACK information or ACK information) may be received from the second UE through the PSFCH. In step S640, the first UE may transmit/report HARQ feedback information to the base station through the PUCCH or the PUSCH. For example, the HARQ feedback information reported to the base station may be information generated by the first UE based on the HARQ feedback information received from the second UE. For example, the HARQ feedback information reported to the base station may be information generated by the first UE based on a pre-configured rule. For example, the DCI may be a DCI for SL scheduling. For example, a format of the DCI may be a DCI format 3_0 or a DCI format 3_1.

Hereinafter, an example of DCI format 3_0 will be described.

DCI format 3_0 is used for scheduling of NR PSCCH and NR PSSCH in one cell.

The following information is transmitted by means of the DCI format 3_0 with CRC scrambled by SL-RNTI or SL-CS-RNTI:

- Resource pool index—ceiling ($\log_2$ I) bits, where I is the number of resource pools for transmission configured by the higher layer parameter sl-TxPoolScheduling.
- Time gap—3 bits determined by higher layer parameter sl-DCI-ToSL-Trans
- HARQ process number—4 bits
- New data indicator—1 bit
- Lowest index of the subchannel allocation to the initial transmission—ceiling ($\log_2(N^{SL}_{subChannel})$) bits
- SCI format 1-A fields: frequency resource assignment, time resource assignment
- PSFCH-to-HARQ feedback timing indicator—ceiling ($\log_2 N_{tb\_timing}$) bits, where $N_{tb\_timing}$ is the number of entries in the higher layer parameter sl-PSFCH-To-PUCCH.
- PUCCH resource indicator—3 bits
- Configuration index—0 bit if the UE is not configured to monitor DCI format 3_0 with CRC scrambled by SL-CS-RNTI; otherwise 3 bits. If the UE is configured to monitor DC format 3_0 with CRC scrambled by SL-CS-RNTI, this field is reserved for DCI format 3_0 with CRC scrambled by SL-RNTI.
- Counter sidelink assignment index—2 bits, 2 bits if the UE is configured with pdsch-HARQ-ACK-Codebook=dynamic, 2 bits if the UE is configured with pdsch-HARQ-ACK-Codebook=semi-static
- Padding bits, if required Referring to (b) of FIG. 6, in the LTE transmission mode 2, the LTE transmission mode 4, or the NR resource allocation mode 2, a UE may determine SL transmission resource(s) within SL resource(s) configured by a base station/network or pre-configured SL resource(s). For example, the configured SL resource(s) or the pre-configured SL resource(s) may be a resource pool. For example, the UE may autonomously select or schedule resource(s) for SL transmission. For example, the UE may perform SL communication by autonomously selecting resource(s) within the configured resource pool. For example, the UE may autonomously select resource(s) within a selection window by performing a sensing procedure and a resource (re)selection procedure. For example, the sensing may be performed in a unit of subchannel(s). For example, in step S610, a first UE which has selected resource(s) from a resource pool by itself may transmit a PSCCH (e.g., sidelink control information (SCI) or $1^{st}$-stage SCI) to a second UE by using the resource(s). In step S620, the first UE may transmit a PSSCH (e.g., $2^{nd}$-stage SCI, MAC PDU, data, etc.) related to the PSCCH to the second UE. In step S630, the first UE may receive a PSFCH related to the PSCCH/PSSCH from the second UE.

Referring to (a) or (b) of FIG. 6, for example, the first UE may transmit a SCI to the second UE through the PSCCH. Alternatively, for example, the first UE may transmit two consecutive SCIs (e.g., 2-stage SCI) to the second UE through the PSCCH and/or the PSSCH. In this case, the second UE may decode two consecutive SCIs (e.g., 2-stage SCI) to receive the PSSCH from the first UE. In the present disclosure, a SCI transmitted through a PSCCH may be referred to as a $1^{st}$ SCI, a first SCI, a $1^{st}$-stage SCI or a $1^{st}$-stage SCI format, and a SCI transmitted through a PSSCH may be referred to as a $2^{nd}$ SCI, a second SCI, a $2^{nd}$-stage SCI or a $2^{nd}$-stage SCI format. For example, the $1^{st}$-stage SCI format may include a SCI format 1-A, and the $2^{nd}$-stage SCI format may include a SCI format 2-A and/or a SCI format 2-B.

Hereinafter, an example of SCI format 1-A will be described.

SCI format 1-A is used for the scheduling of PSSCH and 2nd-stage-SCI on PSSCH.

The following information is transmitted by means of the SCI format 1-A:

- Priority—3 bits
- Frequency resource assignment—

$$\text{ceiling}\left(\log_2\left(N^{SL}_{subChannel}\left(N^{SL}_{subChannel}+1\right)/2\right)\right)\text{ bits}$$

when the value of the higher layer parameter sl-MaxNumPerReserve is configured to 2; otherwise $$\text{ceiling }\log_2\left(N^{SL}_{subChannel}\left(N^{SL}_{subChannel}+1\right)\left(2N^{SL}_{subChannel}+1\right)/6\right)\text{ bits}$$

when the value of the higher layer parameter sl-MaxNumPerReserve is configured to 3

- Time resource assignment—5 bits when the value of the higher layer parameter sl-MaxNumPerReserve is configured to 2; otherwise 9 bits when the value of the higher layer parameter sl-MaxNumPerReserve is configured to 3
- Resource reservation period—ceiling ($\log_2 N_{rsv\_period}$) bits, where $N_{rsv\_period}$ is the number of entries in the higher layer parameter sI-ResourceReservePeriodList, if higher layer parameter sl-MultiReserveResource is configured; 0 bit otherwise DMRS pattern—ceiling ($\log_2 N_{pattern}$) bits, where $N_{pattern}$ is the number of DMRS patterns configured by higher layer parameter sl-PSSCH-DMRS-TimePatternList $2^{nd}$-stage SCI format—2 bits as defined in Table 5

Beta_offset indicator—2 bits as provided by higher layer parameter sl-BetaOffsets2ndSCI Number of DMRS port—1 bit as defined in Table 6

Modulation and coding scheme—5 bits

Additional MCS table indicator—1 bit if one MCS table is configured by higher layer parameter sl-Additional-MCS-Table; 2 bits if two MCS tables are configured by higher layer parameter sl-Additional-MCS-Table; 0 bit otherwise PSFCH overhead indication—1 bit if higher layer parameter sl-PSFCH-Period=2 or 4; 0 bit otherwise Reserved—a number of bits as determined by higher layer parameter sl-NumReservedBits. with value set to zero.

TABLE 5

| Value of 2nd-stage SCI format field | 2nd-stage SCI format |
|---|---|
| 00 | SCI format 2-A |
| 01 | SCI format 2-B |
| 10 | Reserved |
| 11 | Reserved |

TABLE 6

| Value of the Number of DMRS port field | Antenna ports |
|---|---|
| 0 | 1000 |
| 1 | 1000 and 1001 |

Hereinafter, an example of SCI format 2-A will be described.

SCI format 2-A is used for the decoding of PSSCH, with HARQ operation when HARQ-ACK information includes ACK or NACK, when HARQ-ACK information includes only NACK, or when there is no feedback of HARQ-ACK information.

The following information is transmitted by means of the SCI format 2-A:

HARQ process number—4 bits

New data indicator—1 bit

Redundancy version—2 bits

Source ID—8 bits

Destination ID—16 bits

HARQ feedback enabled/disabled indicator—1 bit

Cast type indicator—2 bits as defined in Table 7

CSI request—1 bit

TABLE 7

| Value of Cast type indicator | Cast type |
|---|---|
| 00 | Broadcast |
| 01 | Groupcast when HARQ-ACK information includes ACK or NACK |
| 10 | Unicast |
| 11 | Groupcast when HARQ-ACK information includes only NACK |

Hereinafter, an example of SCI format 2-B will be described.

SCI format 2-B is used for the decoding of PSSCH, with HARQ operation when HARQ-ACK information includes only NACK, or when there is no feedback of HARQ-ACK information.

The following information is transmitted by means of the SCI format 2-B:

HARQ process number—4 bits

New data indicator—1 bit

Redundancy version—2 bits

Source ID—8 bits

Destination ID—16 bits

HARQ feedback enabled/disabled indicator—1 bit

Zone ID—12 bits

Communication range requirement—4 bits determined by higher layer parameter sl-ZoneConfigMCR-Index Referring to (a) or (b) of FIG. 6, in step S630, the first UE may receive the PSFCH. For example, the first UE and the second UE may determine a PSFCH resource, and the second UE may transmit HARQ feedback to the first UE using the PSFCH resource.

Referring to (a) of FIG. 6, in step S640, the first UE may transmit SL HARQ feedback to the base station through the PUCCH and/or the PUSCH.

Figure 7:
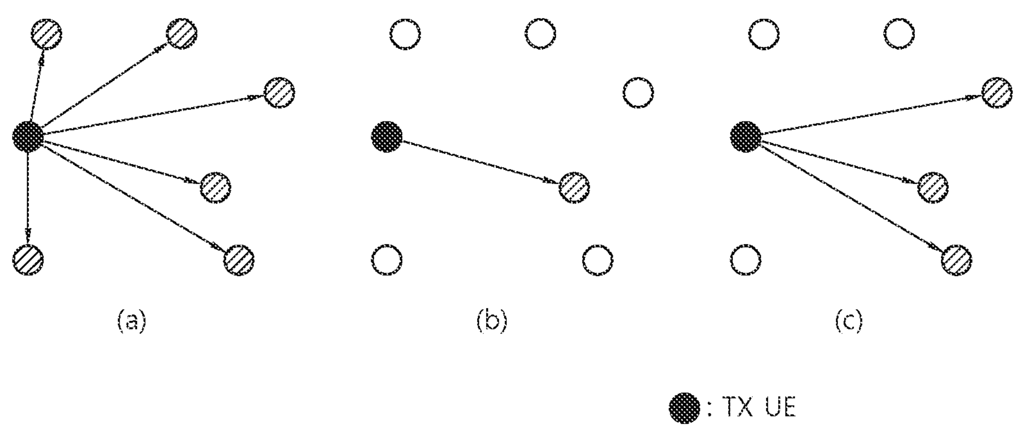
FIG. 7 shows three cast types, based on an embodiment of the present disclosure.

FIG. 7 shows three cast types, based on an embodiment of the present disclosure. The embodiment of FIG. 7 may be combined with various embodiments of the present disclosure. Specifically, (a) of FIG. 7 shows broadcast-type SL communication, (b) of FIG. 7 shows unicast type-SL communication, and (c) of FIG. 7 shows groupcast-type SL communication. In case of the unicast-type SL communication, a UE may perform one-to-one communication with respect to another UE. In case of the groupcast-type SL transmission, the UE may perform SL communication with respect to one or more UEs in a group to which the UE belongs. In various embodiments of the present disclosure, SL groupcast communication may be replaced with SL multicast communication, SL one-to-many communication, or the like.

Hereinafter, a hybrid automatic repeat request (HARQ) procedure will be described.

For example, the SL HARQ feedback may be enabled for unicast. In this case, in a non-code block group (non-CBG) operation, if the receiving UE decodes a PSCCH of which a target is the receiving UE and if the receiving UE successfully decodes a transport block related to the PSCCH, the receiving UE may generate HARQ-ACK. In addition, the receiving UE may transmit the HARQ-ACK to the transmitting UE. Otherwise, if the receiving UE cannot successfully decode the transport block after decoding the PSCCH of which the target is the receiving UE, the receiving UE may generate the HARQ-NACK. In addition, the receiving UE may transmit HARQ-NACK to the transmitting UE.

For example, the SL HARQ feedback may be enabled for groupcast. For example, in the non-CBG operation, two HARQ feedback options may be supported for groupcast.

(1) Groupcast option 1: After the receiving UE decodes the PSCCH of which the target is the receiving UE, if the receiving UE fails in decoding of a transport block related to the PSCCH, the receiving UE may transmit HARQ-NACK to the transmitting UE through a PSFCH. Otherwise, if the receiving UE decodes the PSCCH of which the target is the receiving UE and if the receiving UE successfully decodes the transport block related to the PSCCH, the receiving UE may not transmit the HARQ-ACK to the transmitting UE.

(2) Groupcast option 2: After the receiving UE decodes the PSCCH of which the target is the receiving UE, if the receiving UE fails in decoding of the transport block related to the PSCCH, the receiving UE may transmit HARQ-NACK to the transmitting UE through the PSFCH. In addition, if the receiving UE decodes the PSCCH of which the target is the receiving UE and if the receiving UE successfully decodes the transport block related to the PSCCH, the receiving UE may transmit the HARQ-ACK to the transmitting UE through the PSFCH.

For example, if the groupcast option 1 is used in the SL HARQ feedback, all UEs performing groupcast communication may share a PSFCH resource. For example, UEs belonging to the same group may transmit HARQ feedback by using the same PSFCH resource.

For example, if the groupcast option 2 is used in the SL HARQ feedback, each UE performing groupcast communication may use a different PSFCH resource for HARQ feedback transmission. For example, UEs belonging to the same group may transmit HARQ feedback by using different PSFCH resources.

In the present disclosure. HARQ-ACK may be referred to as ACK, ACK information, or positive-ACK information, and HARQ-NACK may be referred to as NACK, NACK information, or negative-ACK information.

Hereinafter, UE procedure for reporting HARQ-ACK on sidelink will be described.

A UE can be indicated by an SCI format scheduling a PSSCH reception, in one or more sub-channels from a number of $N^{PSSCH}_{subch}$ sub-channels, to transmit a PSFCH with HARQ-ACK information in response to the PSSCH reception. The UE provides HARQ-ACK information that includes ACK or NACK, or only NACK.

A UE can be provided, by sl-PSFCH-Period-r16, a number of slots in a resource pool for a period of PSFCH transmission occasion resources. If the number is zero, PSFCH transmissions from the UE in the resource pool are disabled. A UE expects that a slot $t'^{SL}_k$ ($0 \le k < T'_{max}$) has a PSFCH transmission occasion resource if k mod $N^{PSFCH}_{PSSCH}=0$, where $t'^{SL}_k$ is a slot that belongs to the resource pool, $T'_{max}$ is a number of slots that belong to the resource pool within 10240 msec, and $N^{PSFCH}_{PSSCH}$ is provided by sl-PSFCH-Period-r16. A UE may be indicated by higher layers to not transmit a PSFCH in response to a PSSCH reception. If a UE receives a PSSCH in a resource pool and the HARQ feedback enabled/disabled indicator field in an associated SCI format 2-A or a SCI format 2-B has value 1, the UE provides the HARQ-ACK information in a PSFCH transmission in the resource pool. The UE transmits the PSFCH in a first slot that includes PSFCH resources and is at least a number of slots, provided by sl-MinTimeGapPSFCH-r16, of the resource pool after a last slot of the PSSCH reception.

A UE is provided by sl-PSFCH-RB-Set-r16 a set of $$M^{PSFCH}_{PRB,set}\ PRBs$$

in a resource pool for PSFCH transmission in a PRB of the resource pool. For a number of $N_{subch}$ sub-channels for the resource pool, provided by sl-NumSubchannel, and a number of PSSCH slots associated with a PSFCH slot that is less than or equal to $N^{PSFCH}_{PSSCH}$, the UE allocates the $$\left[\left(i+j\cdot N^{PSFCH}_{PSSCH}\right)\cdot M^{PSFCH}_{subch,slot},\ \left(i+1+j\cdot N^{PSFCH}_{PSSCH}\right)\cdot M^{PSFCH}_{subch,slot}-1\right]\ PRBs$$

from the $M_{PRB,set}^{PSFCH}$ PRBs to slot i among the PSSCH slots associated with the PSFCH slot and sub-channel j, where $$M^{PSFCH}_{subch,slot}=M^{PSFCH}_{PRB,set}/\left(N_{subch}\cdot N^{PSFCH}_{PSSCH}\right),\ 0\le i<N^{PSFCH}_{PSSCH},\ 0\le j<N_{subch},$$

and the allocation starts in an ascending order of i and continues in an ascending order of j. The UE expects that $$M^{PSFCH}_{PRB,set}$$

is a multiple of $$N_{subch}\cdot N^{PSFCH}_{PSSCH}.$$

A UE determines a number of PSFCH resources available for multiplexing HARQ-ACK information in a PSFCH transmission as $$R^{PSFCH}_{PRB,CS}=N^{PSFCH}_{type}\cdot M^{PSFCH}_{subch,slot}\cdot N^{PSFCH}_{CS}\ \text{where}\ N^{PSFCH}_{CS}$$

is a number of cyclic shift pairs for the resource pool and, based on an indication by higher layers, $$N^{PSFCH}_{type}=1\ \text{and the}\ M^{PSFCH}_{subch,slot}\ PRBs$$

are associated with the starting sub-channel of the corresponding PSSCH $$N^{PSFCH}_{type}=N^{PSSCH}_{subch}\ \text{and the}\ N^{PSSCH}_{subch}\cdot M^{PSFCH}_{subch,slot}\ PRBs$$

are associated with one or more sub-channels from the $$N^{PSSCH}_{subch}$$

sub-channels of the corresponding PSSCH

The PSFCH resources are first indexed according to an ascending order of the PRB index, from the $$N^{PSFCH}_{type}\cdot M^{PSFCH}_{subch,slot}\ PRBs,$$

and then according to an ascending order of the cyclic shift pair index from the $$N^{PSFCH}_{CS}$$

cyclic shift pairs.

A UE determines an index of a PSFCH resource for a PSFCH transmission in response to a PSSCH reception as $$(P_{ID}+M_{ID}) \bmod R_{PRB,CS}^{PSFCH}$$

where $P_{ID}$ is a physical layer source ID provided by SCI format 2-A or 2-B scheduling the PSSCH reception, and $M_{ID}$ is the identity of the UE receiving the PSSCH as indicated by higher layers if the UE detects a SCI format 2-A with Cast type indicator field value of "01"; otherwise, $M_{ID}$ is zero.

A UE determines a $m_0$ value, for computing a value of cyclic shift α, from a cyclic shift pair index corresponding to a PSFCH resource index and from $$N_{CS}^{PSFCH}$$

using Table 8.

TABLE 8

| | $m_0$ | | | | | |
|---|---|---|---|---|---|---|
| $N_{CS}^{PSFCH}$ | cyclic shift pair index 0 | cyclic shift pair index 1 | cyclic shift pair index 2 | cyclic shift pair index 3 | cyclic shift pair index 4 | cyclic shift pair index 5 |
| 1 | 0 | — | — | — | — | — |
| 2 | 0 | 3 | — | — | — | — |
| 3 | 0 | 2 | 4 | — | — | — |
| 6 | 0 | 1 | 2 | 3 | 4 | 5 |

A UE determines a $m_{cs}$ value, for computing a value of cyclic shift α, as in Table 9 if the UE detects a SCI format 2-A with Cast type indicator field value of "01" or "10", or as in Table 10 if the UE detects a SCI format 2-B or a SCI format 2-A with Cast type indicator field value of "11". The UE applies one cyclic shift from a cyclic shift pair to a sequence used for the PSFCH transmission.

TABLE 9

| HARQ-ACK Value | 0 (NACK) | 1 (ACK) |
|---|---|---|
| Sequence cyclic shift | 0 | 6 |

TABLE 10

| HARQ-ACK Value | 0 (NACK) | 1 (ACK) |
|---|---|---|
| Sequence cyclic shift | 0 | N/A |

Hereinafter, UE procedure for determining the subset of resources to be reported to higher layers in PSSCH resource selection in sidelink resource allocation mode 2 will be described.

In resource allocation mode 2, the higher layer can request the UE to determine a subset of resources from which the higher laver will select resources for PSSCH/PSCCH transmission. To trigger this procedure, in slot n, the higher layer provides the following parameters for this PSSCH/PSCCH transmission:

- the resource pool from which the resources are to be reported;
- L1 priority, $prio_{TX}$;
- the remaining packet delay budget;
- the number of sub-channels to be used for the PSSCH/PSCCH transmission in a slot, $L_{subCH}$;
- optionally, the resource reservation interval, $P_{rsvp\_TX}$, in units of msec.
- if the higher layer requests the UE to determine a subset of resources from which the higher layer will select resources for PSSCH/PSCCH transmission as part of re-evaluation or pre-emption procedure, the higher layer provides a set of resources $(r_0, r_1, r_2, \ldots)$ which may be subject to re-evaluation and a set of resources $$(r_0', r_1', r_2', \ldots)$$

which may be subject to pre-emption.

- it is up to UE implementation to determine the subset of resources as requested by higher layers before or after the slot $$r_i'' - T_3,$$

where $$r_i''$$

is the slot with the smallest slot index among $(r_0, r_1, r_2, \ldots)$ and $$(r_0', r_1', r_2', \ldots),$$

and $T_3$ is equal to $$T_{proc,1}^{SL}.\ \text{Herein, } T_{proc,1}^{SL}$$

is defined as the number of slots based on SCS, where $\mu_{SL}$ is the SCS configuration of the SL BWP.

The following higher layer parameters affect this procedure;

- sl-SelectionWindowList: internal parameter $T_{2min}$ is set to the corresponding value from higher layer parameter sl-SelectionWindowList for the given value of $prio_{TX}$.
- sl-Thres-RSRP-List: this higher layer parameter provides an RSRP threshold for each combination $(p_i, p_j)$, where $p_i$ is the value of the priority field in a received SCI format 1-A and $p_j$ is the priority of the transmission of the UE selecting resources; for a given invocation of this procedure, $p_j=prio_{TX}$.
- sl-RS-ForSensing selects if the UE uses the PSSCH-RSRP or PSCCH-RSRP measurement.
- sl-ResourceReservePeriodList
- sl-SensingWindow: internal parameter $T_0$ is defined as the number of slots corresponding to sl-SensingWindow msec.
- sl-TxPercentageList: internal parameter X for a given $prio_{TX}$ is defined as sl-TxPercentageList ($prio_{TX}$) converted from percentage to ratio.
- sl-PreemptionEnable: if sl-PreemptionEnable is provided, and if it is not equal to 'enabled', internal parameter $prio_{pre}$ is set to the higher layer provided parameter sl-PreemptionEnable.

The resource reservation interval, $P_{rsvp\_TX}$, if provided, is converted from units of msec to units of logical slots, resulting in $P'_{rsvp\_TX}$.

Notation:

$$\left(t_0'^{SL}, t_1'^{SL}, t_2'^{SL}, \ldots\right)$$

denotes the set of slots which belongs to the sidelink resource pool.

For example, the UE may select a set of candidate resources ($S_A$) based on Table 11. For example, if resource (re)selection is triggered, the UE may select a set of candidate resources ($S_A$) based on Table 11. For example, if re-evaluation or pre-emption is triggered, the UE may select a set of candidate resources ($S_A$) based on Table 11.

TABLE 11

The following steps are used:

1) A candidate single-slot resource for transmission $R_{x,y}$ is defined as a set of $L_{subCH}$ contiguous sub-channels with sub-channel x+j in slot $t'^{SL}_y$ where $j = 0, \ldots, L_{subCH} - 1$. The UE shall assume that any set of $L_{subCH}$ contiguous sub-channels included in the corresponding resource pool within the time interval $[n + T_1, n + T_2]$ correspond to one candidate single-slot resource, where
   - selection of $T_1$ is up to UE implementation under $0 \leq T_1 \leq T^{SL}_{proc,1}$, where $T^{SL}_{proc,1}$ is defined in slots in Table 8.1.4-2 where $\mu_{SL}$ is the SCS configuration of the SL BWP;
   - if $T_{2min}$ is shorter than the remaining packet delay budget (in slots) then $T_2$ is up to UE implementation subject to $T_{2min} \leq T_2 \leq$ remaining packet delay budget (in slots); otherwise $T_2$ is set to the remaining packet delay budget (in slots).

The total number of candidate single-slot resources is denoted by $M_{total}$.

2) The sensing window is defined by the range of slots $[n - T_0, n - T^{SL}_{proc,0})$ where $T_0$ is defined above and $T^{SL}_{proc,0}$ is defined in slots in Table 8.1.4-1 where $\mu_{SL}$ is the SCS configuration of the SL BWP. The UE shall monitor slots which belongs to a sidelink resource pool within the sensing window except for those in which its own transmissions occur. The UE shall perform the behaviour in the following steps based on PSCCH decoded and RSRP measured in these slots.
3) The internal parameter $Th(p_i, p_j)$ is set to the corresponding value of RSRP threshold indicated by the i-th field in si-Thres-RSRP-List, where $i = p_i + (p_j - 1) * 8$.
4) The set $S_A$ is initialized to the set of all the candidate single-slot resources.
5) The UE shall exclude any candidate single-slot resource $R_{x,y}$ from the set $S_A$ if it meets all the following conditions:
   - the UE has not monitored slot $t'^{SL}_m$ in Step 2.
   - for any periodicity value allowed by the higher layer parameter sl-ResourceReservePeriodList and a hypothetical SCI format 1-A received in slot $t'^{SL}_m$ with 'Resource reservation period' field set to that periodicity value and indicating all subchannels of the resource pool in this slot, condition c in step 6 would be met.

5a) If the number of candidate single-slot resources $R_{x,y}$ remaining in the set $S_A$ is smaller than $X \cdot M_{total}$, the set SA is initialized to the set of all the candidate single-slot resources as in step 4.

6) The UE shall exclude any candidate single-slot resource $R_{x,y}$ from the set $S_A$ if it meets all the following conditions:
   a) the UE receives an SCI format 1−A in slot $t'^{SL}_m$, and 'Resource reservation period' field, if present, and 'Priority' field in the received SCI format 1-A indicate the values $P_{rsvp\_RX}$ and $prio_{RX}$, respectively;
   b) the RSRP measurement performed, for the received SCI format 1-A, is higher than $Th(prio_{RX}, prio_{TX})$;
   c) the SCI format received in slot $t'^{SL}_m$ or the same SCI format which, if and only if the 'Resource reservation period' field is present in the received SCI format 1-A, is assumed to be received in slot(s) $t'^{SL}_{m+q\times P'_{rsvp\_RX}}$ determines the set of resource blocks and slots which overlaps with $R_{x,y+j\times P'_{rsvp\_TX}}$ for $q = 1, 2, \ldots, Q$ and $j = 0, 1, \ldots, C_{resel} - 1$. Here, $P'_{rsvp\_RX}$ is $P_{rsvp\_RX}$ converted to units of logical slots, $Q = \left\lceil \frac{T_{scal}}{P_{rsvp\_RX}} \right\rceil$ if $P_{rsvp\_RX} < T_{scal}$ and $n' - m \leq P_{rsvp\_RX}$, where TABLE 11-continued

| |
|---|
| $t'^{SL}_{n'} = n$ if slot n belongs to the set $(t'^{SL}_0, t'^{SL}_1, \ldots, t'^{SL}_{T'_{max}-1})$, otherwise slot $t'^{SL}_{\mu'}$ is the first slot after slot n belonging to the set $(t'^{SL}_0, t'^{SL}_1, \ldots, t'^{SL}_{T'_{max}-1})$; otherwise Q = 1. $T_{scal}$ is set to selection window size $T_2$ converted to units of msec. |
| 7) If the number of candidate single-slot resources remaining in the set $S_A$ is smaller than $X \cdot M_{total}$, then $Th(p_i, p_j)$ is increased by 3 dB for each priority value $Th(p_i, p_j)$ and the procedure continues with step 4. |
| The UE sball report set $S_A$ to higher layers. |
| If a resource $r_i$ from the set $(r_0, r_1, r_2, \ldots)$ is not a member of $S_A$, then the UE shall report re-evaluation of the resource $r_i$ to higher layers. |
| If a resource $r'_i$ from the set $(r'_0, r'_1, r'_2, \ldots)$ meets the conditions below then the UE shall report pre-emption of the resource $r'_i$ to higher layers |
| $r'_i$ is not a member of $S_A$, and |
| $r'_i$ meets the conditions for exclusion in step 6, with $Th(prio_{RX}, prio_{TX})$ set to the final threshold after executing steps 1)-7), i.e. including all necessary increments for reaching $X \cdot M_{total}$, and the associated priority $prio_{RX}$, satisfies one of the following conditions: |
| si-PreemptionEnable is provided and is equal to 'enabled' and $prio_{TX} > prio_{RX}$ |
| sl-Preemption Enable is provided and is not equal to 'enabled', and $prio_{RX} < prio_{pre}$ and $prio_{TX} > prio_{RX}$ |

Meanwhile, partial sensing may be supported for power saving of the UE. For example, in LTE SL or LTE V2X, the UE may perform partial sensing based on Tables 12 and 13.

TABLE 12

| |
|---|
| In sidelink transmission mode 4, when requested by higher layers in subframe n for a carrier, the UE shall determine the set of resources to be reported to higher layers for PSSCH transmission according to the steps described in this Subclause. Parameters $L_{subCH}$ the number of sub-channels to be used for the PSSCH transmission in a subframe, $P_{rsvp\_TX}$ the resource reservation interval, and $prio_{TX}$ the priority to be transmitted in the associated SCI format I by the UE are all provided by higher layers. |
| In sidelink transmission mode 3, when requested by higher layers in subframe n for a carrier, the UE shall determine the set of resources to be reported to higher layers in sensing measurement according to the steps described in this Subclause. Parameters $L_{subCH}$, $P_{rsvp\_TX}$ and $prio_{TX}$ are all provided by higher layers. $C_{resel}$ is determined by $C_{resel}$ = 10 * SL_RESOURCE_RESELECTION_COUNTER, where SL RESOURCE RESELECTION_COUNTER is provided by higher layers. |
| . . . |
| If partial sensing is configured by higher layers then the following steps are used: |
| 1) A candidate single-subframe resource for PSSCH transmission$R_{x,y}$ is defined as a set of $L_{subCH}$ contignous sub-channels with sub-channel x + j in subframe $t^{SL}_y$ where $j = 0, \ldots, L_{subCH} - 1$. The UE shall determine by its implementation a set of subframes which consists of at least Y subframes within the time interval $[n + T_1, n + T_2]$ where selections of $T_1$ and $T_2$ are up to UE implementations under $T_1 \le 4$ and $T_{2min}(prio_{TX}) \le T_2 \le 100$, if $T_{2min}(prio_{TX})$ is provided by higher layers for $prio_{TX}$, otherwise $20 \le T_2 \le 100$ . UE selection of $T_2$ shall fulfil the latency requirement and Y shall be greater than or equal to the high layer parameter minNumCandidateSF. The UE shall assume that any set of $L_{subCH}$ contiguous sub-channels included in the corresponding PSSCH resource pool within the determined set of subframes correspond to one candidate single-subframe resource. The total number of the candidate single-subframe resources is denoted by $M_{total}$. |
| 2) If a subframe $t^{SL}_y$ is included in the set of subframes in Step 1, the UE shall monitor any subframe $t^{SL}_{y-k\times P_{step}}$ if k-th bit of the high layer parameter gapCandidateSensing is set to 1. The UE shall perform the behaviour in the following steps based on PSCCH decoded and S-RSSI measured in these subframes. |
| 3) The parameter $Th_{a,b}$, is set to the value indicated by the i-th SL-ThresPSSCH-RSRP field in SL-ThresPSSCH-RSRP-List where i = (a − 1) * 8 + b. |
| 4) The set $S_A$ is initialized to the union of all the candidate single-subframe resources. The set $S_B$ is initialized to an empty set. |

TABLE 12-continued

5) The UE shall exclude any candidate single-subframe resource $R_{x,y}$ from the set $S_A$ if it meets all the following conditions:

the UE receives an SCI format 1 in subframe $t_m^{SL}$, and "Resource reservation" field and "Priority" field in the received SCI format 1 indicate the values $P_{rsvp\_RX}$ and $prio_{RX}$, respectively.
PSSCH-RSRP measurement according to the received SCI format 1 is higher than $Th_{prio_{TX},prio_{RX}}$.

the SCI format received in subframe $t_m^{SL}$ or the same SCI format 1 which is assumed to be received in subframe(s) $t_{m+q\times P_{step}\times P_{rsvp\_RX}}^{SL}$ determines according to 14.1.1.4C the set of resource blocks and subframes which overlaps with $R_{x,y+j\times P'_{rsvp\_TX}}$ for $q = 1, 2, \ldots, Q$ and $j = 0, 1, \ldots, C_{resel} - 1$. Here, $Q = \frac{1}{P_{rsvp\_RX}}$ if $P_{rsvp\_RX} < 1$ and $y' - m \le P_{step} \times P_{rsvp\_RX} + P_{step}$, where $t_{y'}^{SL}$ is the last subframe of the Y subframes, and $Q = 1$ otherwise.

6) If the number of candidate single-subframe resources remaining in the set S, is smaller than $0.2 \cdot M_{total}$, then Step 4 is repeated with $Th_{s,b}$; increased by 3 dB.

TABLE 13

7) For a candidate single-subframe resource $R_{x,y}$ remaining in the set $S_A$ the metric $E_{x,y}$ is is defined as the linear average of S-RSSI measured in sub-channels $x + k$ for $k = 0, \ldots, L_{subCH} - 1$ in the monitored subframes in Step 2 that can be expressed by $t_{y-P_{step}*j}^{SL}$ for a non-negative integer j.
8) The UE moves the candidate single-subframe resource $R_{x,y}$ with the smallest metric $E_{x,y}$ from the set $S_A$ to $S_B$. This step is repeated until the number of candidate single-subframe resources in the set $S_B$ becomes greater than or equal to $0.2 \cdot M_{total}$.
9) When the UE is configured by upper layers to transmit using resource pools on multiple carriers, it shall exclude a candidate single-subframe resource $R_{x,y}$ from $S_B$, if the UE does not support transmission in the candidate single-subframe resource in the carrier under the assumption that transmissions take place in other carrier(s) using the already selected resources due to its limitation in the number of simultaneous transmission carriers, its limitation in the supported carrier combinations, or interruption for RF retuning time.

The UE shall report set $S_B$ to higher layers.
If transmission based on random selection is configured by upper layers and when the UE is configured by upper layers to transmit using resource pools on multiple carriers, the following steps are used:

1) A candidate single-subframe resource for PSSCH transmission $R_{x,y}$ is defined as a set of $L_{subCH}$ contiguous sub-channels with sub-channel x+j in subframe $t_y^{SL}$ where $j = 0, \ldots, L_{subCH} - 1$. The UE shall assume that any set of $L_{subcH}$ contiguous sub-channels included in the corresponding PSSCH resource pool within the time interval $[n + T_1, n + T_2]$ corresponds to one candidate single-subframe resource, where selections of $T_1$ and $T_2$ are up to UE implementations under $T_1 \le 4$ and $T_{2min}(prio_{TX}) \le T_2 \le 100$, if $T_{2min}(prio_{TX})$ is provided by higher layers for $prio_{TX}$, otherwise $20 \le T_2 \le 100$. UE selection of $T_2$ shall fulfil the latency requirement. The total number of the candidate single-subframe resources is denoted by $M_{total}$.
2) The set $S_A$ is initialized to the union of all the candidate single-subframe resources. The set $S_B$ is initialized to an empty set.
3) The UE moves the candidate single-subframe resource $R_{x,y}$ from the set $S_A$ to $S_B$.

TABLE 13-continued

4) The UE shall exclude a candidate single-subframe resource $R_{x,y}$ from $S_B$ if the UE does not support transmission in the candidate single-subframe resource in the carrier under the assumption that transmissions take place in other carrier(s) using the already selected resources due to its limitation in the number of simultaneous transmission carriers, its limitation in the supported carrier combinations, or interruption for RF retuning time.

The UE shall report set $S_B$ to higher layers.

Meanwhile, since the conventional sidelink (SL) transmission resource selection is optimized based on full sensing, a problem of reduced efficiency may occur when the UE operates based on partial sensing.

For example, if a UE-A, which intends to transmit a high priority packet (e.g., MAC PDU), selects resources at a high density in a time domain, SL transmission of a UE-B, which intends to transmit a low priority packet, may not be guaranteed.

Figure 8:
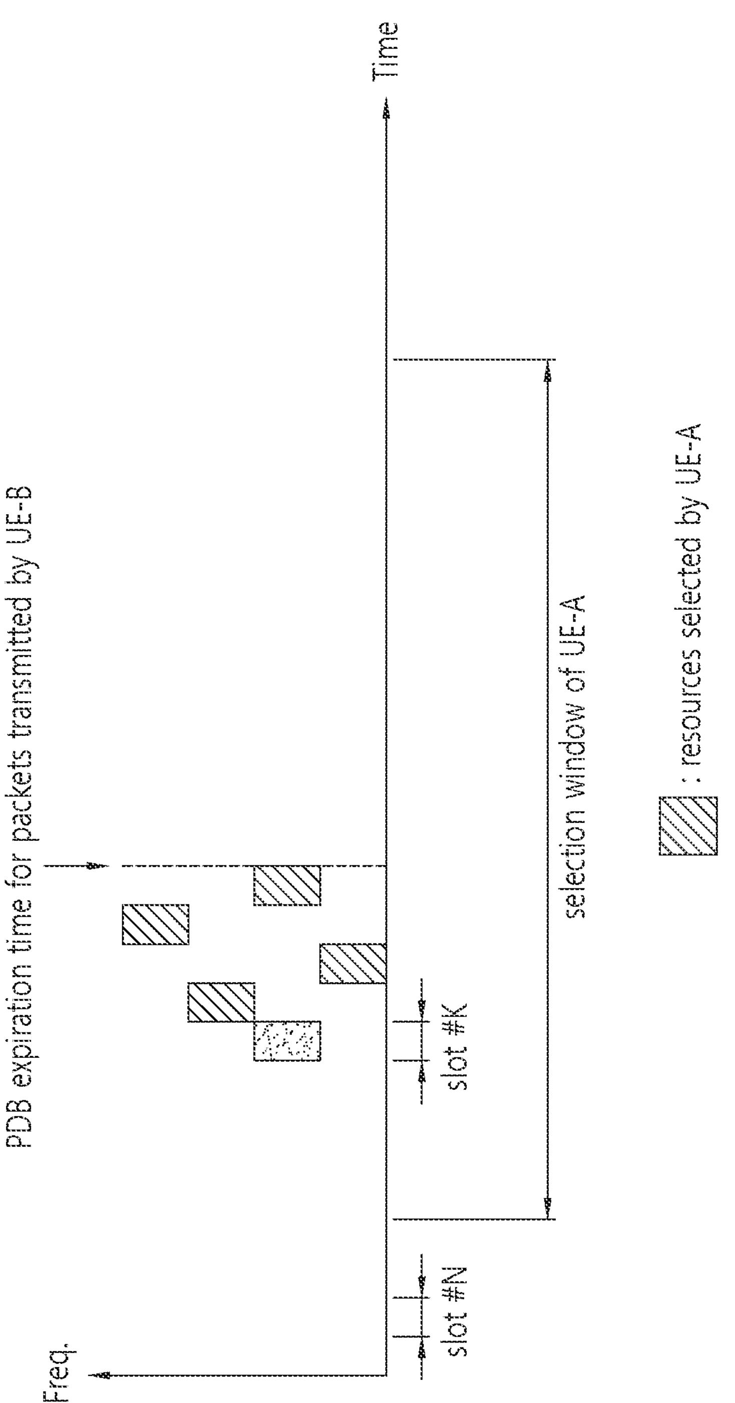
FIG. 8 is a diagram to show a problem in which SL transmission of the UE-B intending to transmit a low priority packet is dropped.

FIG. 8 is a diagram to show a problem in which SL transmission of the UE-B intending to transmit a low priority packet is dropped. The embodiment of FIG. 8 may be combined with various embodiments of the present disclosure.

Referring to FIG. 8, the UE-A may trigger resource selection in a slot #N for transmission of a MAC PDU with a high priority (i.e., a small priority, value). In this case, it is assumed that the UE-A reserves a plurality of resources without limiting a time interval between resources. If a resource reserved by the UE-A and a resource reserved by the UE-B overlap in a slot #K, and the UE-B performs resource re-evaluation or pre-emption checking for the resource reserved in the slot #K, the UE-B that intends to transmit a MAC PDU with a lower priority (i.e., a larger priority value) shall drop the resource reserved in the slot #K and select other resources. In the above case, it may be difficult for the UE-B to secure other resources within packet delay budget (PDB) related to the MAC PDU due to resources already reserved by the UE-A, which may lead to transmission failure of the UE-B.

Based on various embodiments of the present disclosure, a method for selecting SL transmission resources and an apparatus for supporting the same are proposed that can minimize power consumption of a UE when the UE operates based on partial sensing. In the present disclosure, partial sensing may include periodic-based partial sensing (PPS) or continuous partial sensing (CPS). In the present disclosure, PPS may also be referred to as PBPS.

For example, in various embodiments of the disclosure, periodic-based partial sensing (PPS) may refer to performing sensing, based on the number of periods corresponding to specific configured value(s), at the time corresponding to an integer multiple (k) of each of the periods when performing sensing for resource selection. For example, the periods may be periods of transmission resources configured in a resource pool. For example, resources at the time before the integer multiple k value of each of the periods from the time of candidate resources that are the subject of the resource conflict determination may be sensed. For example, the k value may be configured in the form of a bitmap.

Figure 9:
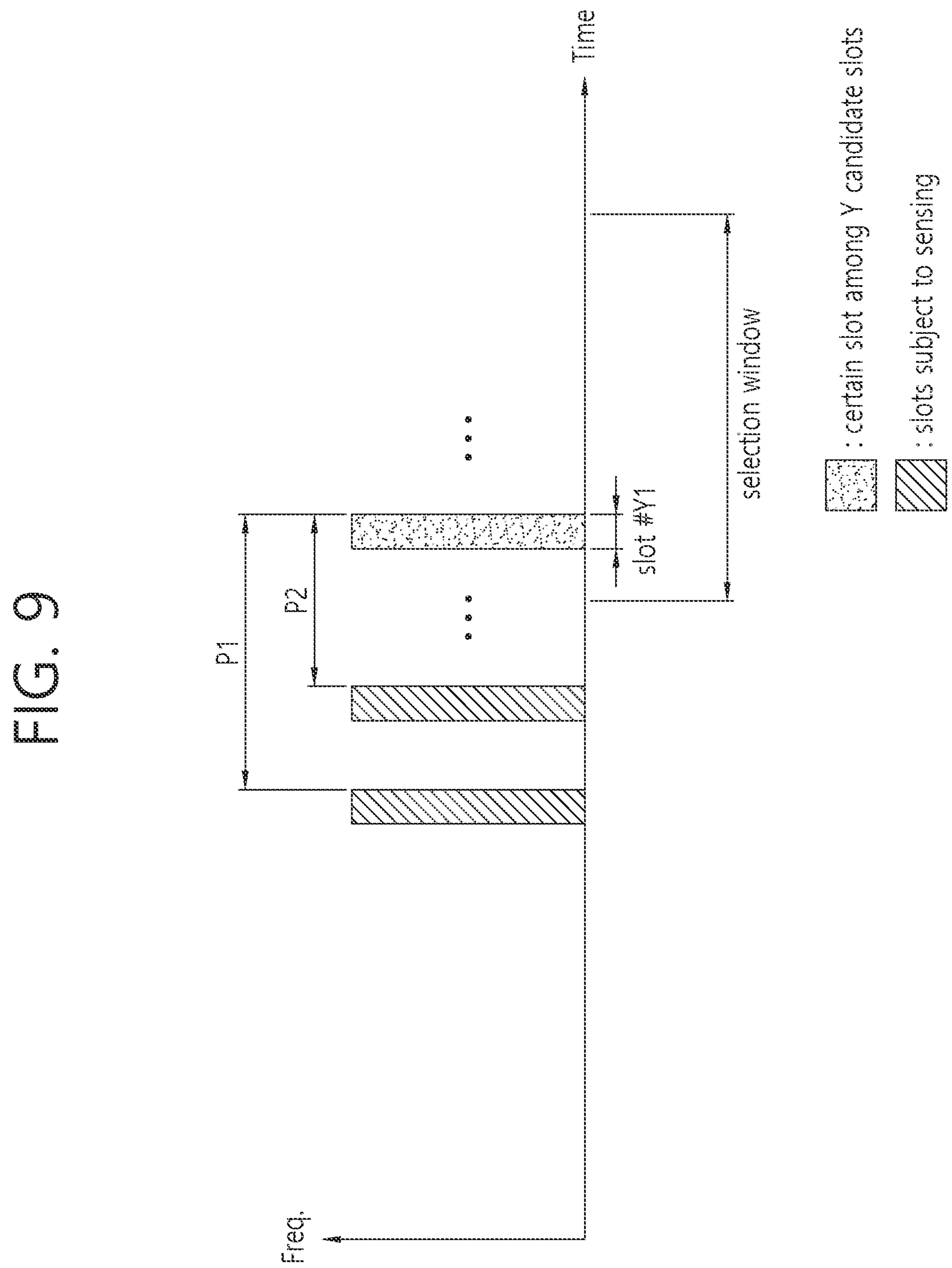
FIGS. 9 and 10 show a method for a UE to perform PPS, based on an embodiment of the present disclosure.
Figure 10:
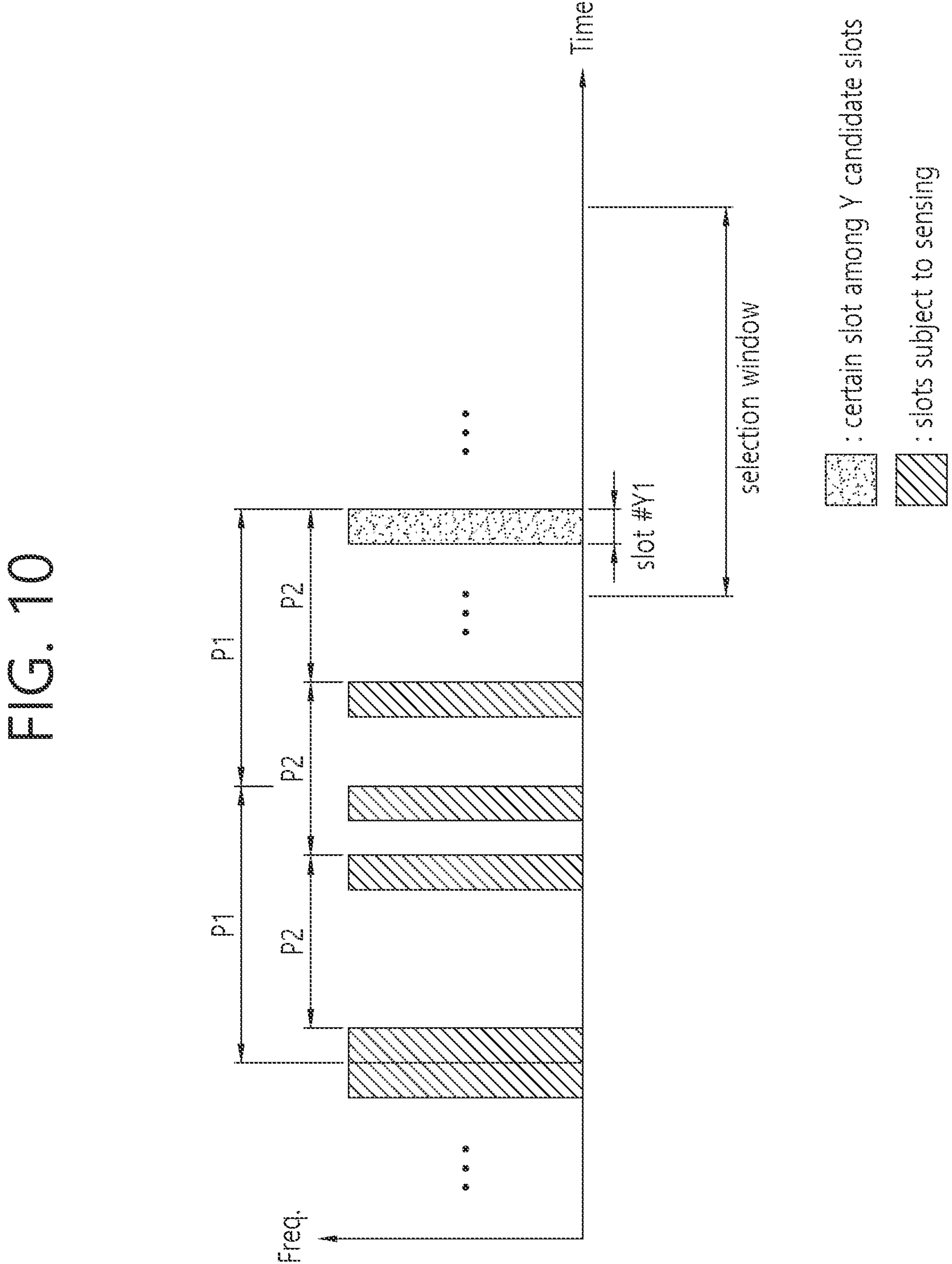

FIGS. 9 and 10 show a method for a UE to perform PPS, based on an embodiment of the present disclosure. The embodiments of FIGS. 9 and 10 may be combined with various embodiments of the present disclosure.

In the embodiments of FIGS. 9 and 10, it is assumed that resource reservation periods allowed for a resource pool or resource reservation periods configured for PPS are P1 and P2. Furthermore, it is assumed that the UE performs partial sensing (i.e., PPS) to select SL resources within the slot #Y1.

Referring to FIG. 9, the UE may perform sensing for the slot located before P1 from the slot #Y1, and for the slot located before P2 from the slot #Y1.

Referring to FIG. 10, the UE may perform sensing for the slot located before P1 from the slot #Y1, and for the slot located before P2 from the slot #Y1. Furthermore, optionally, the UE may perform sensing for the slot located before A*P1 from the slot #Y1, and the slot located before B*P2 from the slot #Y1. For example, A and B may be positive integers greater than or equal to 2. Specifically, for example, the UE that selects the slot #Y1 as a candidate slot may perform sensing for the slot #(Y1−resource reservation period*k), where k may be a bitmap. For example, if k is 10001, the UE that selects the slot #Y1 as a candidate slot may perform sensing for the slot #(Y1−Pi*1), the slot #(Y1−Pi*5), the slot #(Y1−P2*1), and the slot #(Y1−P2*5).

For example, in various embodiments of the present disclosure, continuous partial sensing (CPS) may refer to performing sensing for all or a part of a time domain given a specific configured value. For example, CPS may include a short-term sensing operation that performs sensing for a relatively short interval.

Figure 11:
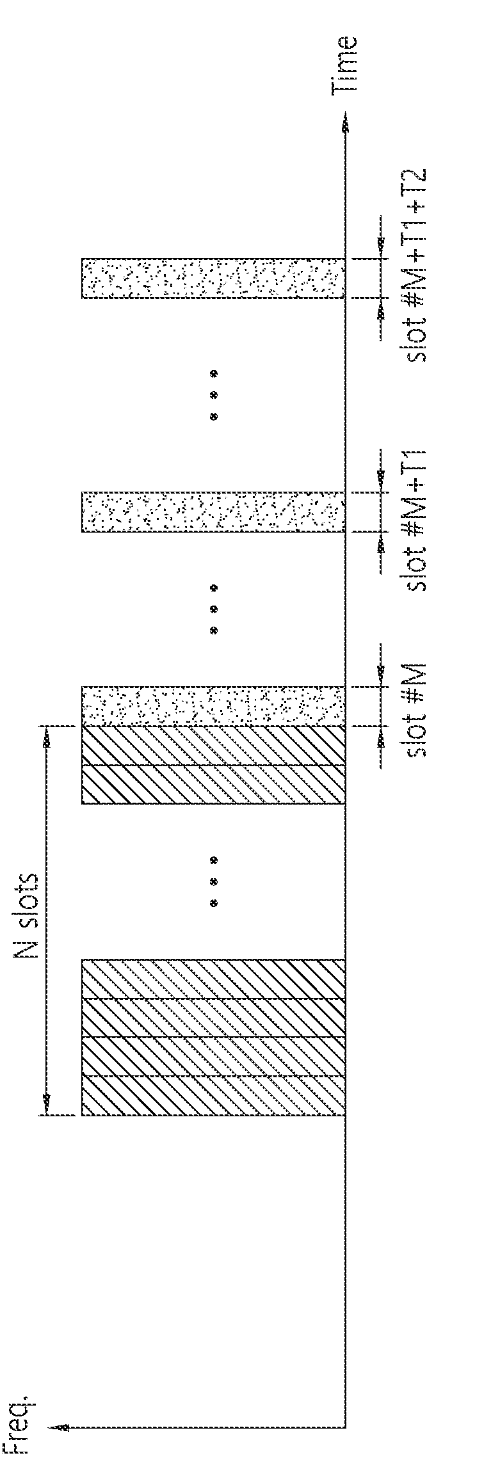
FIG. 11 shows a method for a UE to perform CPS, based on an embodiment of the present disclosure.

FIG. 11 shows a method for a UE to perform CPS, based on an embodiment of the present disclosure. The embodiment of FIG. 11 may be combined with various embodiments of the present disclosure.

In the embodiment of FIG. 11, it is assumed that Y candidate slots selected by the UE are the slot #M, the slot #(M+T1), and the slot #(M+T1+T2). In this case, slots for which the UE should perform sensing may be determined based on the first slot (i.e., slot #M) among the Y candidate slots. For example, after determining the first slot among the Y candidate slots as a reference slot, the UE may perform sensing for N slots (before) from the reference slot.

Referring to FIG. 11, based on the first slot (i.e., slot #M) among the Y candidate slots, the UE may perform sensing for N slots. For example, the UE may perform sensing for N slots before the slot #M, and the UE may select at least one SL resource within the Y candidate slots (i.e., slot #M, slot #(M+T1), and slot #(M+T1+T2)) based on the results of the sensing. For example, N may be configured or pre-configured for the UE. For example, there may be a time gap for processing between the slot #M and the last of the N slots.

For example, when a power saving UE ("P-UE") selects transmission resources based on partial sensing or based on a random resource selection scheme, the P-UE may select transmission resources such that a distance in a time domain between any two reserved resources that can be signaled by one SCI is less than or equal to a specific threshold. For example, when the P-UE detects a resource conflict and reselects a resource based on the result of resource re-evaluation or pre-emption checking, the P-UE may select a transmission resource such that a distance in a time domain between the resource in which the resource conflict is detected and the reselected resource is less than or equal to a specific threshold. For example, if the P-UE transmits a transport block (TB) for which HARQ feedback is enabled, a specific threshold representing a maximum distance between any two resources that can be signaled by the one SC may be configured/determined to be greater than or equal to a HARQ round-trip time (RTT).

For example, the P-UE may select SL transmission resources based on a resource group unit, comprising M resources included in each of temporally contiguous slots, in a domain comprising only the number of SL logical slots set to the specific configured value M (e.g., 2 or 3). For example, when selecting resources based on the resource group unit, the P-UE may reduce signaling overhead by signaling only the M value, instead of time domain resource allocation (TDRA) information for reserved resources, through SCI associated with the first resource within each resource group. For example, the P-UE may reduce signaling overhead by signaling a resource order representing the order of the corresponding resource within the resource group, instead of time domain resource allocation (TDRA) information for the corresponding resource, through each SCI within each of the resources. For example, the P-UE may signal TDRA for the first resource within the next resource group through SCI associated with the last resource within the resource group.

In the present disclosure, a logical slot may refer to a slot belonging to a resource pool. For example, among a plurality of physical slots, a slot belonging to a resource pool may be referred to as a logical slot. For example, among a plurality of physical resources, a resource belonging to a resource pool may be referred to as a logical resource. For example, the UE may determine a resource pool based on Table 14.

TABLE 14

| |
|---|
| A UE can be configured by higher layers with one or more sidelink resource pools. A sidelink resource pool can be for transmission of PSSCH, as described in Clause 8.1, or for reception of PSSCH, as described in Clause 8.3 and can be associated with either sidelink resource allocation mode 1 or sidelink resource allocation mode 2. |
| In the frequency domain, a sidelink resource pool consists of sl-NumSubchannel contiguous sub-channels. A sub-channel consists of sl-SubchannelSize contiguous PRBs, where sl-NumSubchannel and sl-SubchannelSize are higher layer parameters. |

TABLE 14-continued

The set of slots that may belong to a sidelink resource pool is denoted by $\left(t_0^{SL}, t_1^{SL}, \cdots, t_{T_{max}-1}^{SL}\right)$ where $0 \le t_i^{SL} < 10240 \times 2^{\mu}$, $0 \le i < T_{max}$, the slot index is relative to slot#0 of the radio frame corresponding to SFN 0 of the serving cell or DFN 0, the set includes all the slots except the following slots, $N_{S,SSB}$ slots in which S-SS/PSBCH block (S-SSB) is configured, $N_{nonSL}$ slots in each of which at least one of Y-th, (Y + 1)-th, . . . , (Y + X − 1)-th OFDM symbols are not semi-statically configured as UL as per the higher layer parameter idd-UL-DL-ConfigurationCommon of the serving cell if provided or sl-TDD-Configuration if provided or sl-TDD-Config of the received PSBCH if provided, where Y and X are set by the higher layer parameters sl-StartSymbol and sl-LengthSymbols, respectively.

The reserved slots which are determined by the following steps.

1) the remaining slots excluding $N_{S,SSB}$ slots and $N_{nonSL}$ slots from the set of all the slots are denoted by $\left(l_0, l_1, \ldots, l_{(10240 \times 2^{\mu} - N_{S_{SSB}} - N_{nonSL} - 1)}\right)$ arranged in increasing order of slot index.

2) a slot $l_r (0 \le r < 10240 \times 2^{\mu} - N_{S_{SSB}} - N_{nonSL})$ belongs to the reserved slots if r =

$\left\lfloor \frac{m \cdot (10240 \times 2^{\mu} - N_{S_{SSB}} - N_{nonSL})}{N_{reserved}} \right\rfloor$, here m = 0, 1, ..., $N_{reserved} - 1$ and $N_{reserved}$ =

$(10240 \times 2^{\mu} - N_{S_{SSB}} - N_{nonSL}) \bmod L_{bitmap}$ where $L_{bitmap}$ denotes the length of bitmap configured by higher layers.

The slots in the set are arranged in increasing order of slot index.

The UE determines the set of slots assigned to a sidelink resource pool as follows:

a bitmap $(b_0, b_1, \ldots, b_{L_{bitmap}-1})$ associated with the resource pool is used where $L_{bitmap}$ the length of the bitmap is configured by higher layers.

a slot $t_k^{SL} (0 \le k < 10240 \times 2^{\mu} - N_{S_{SSB}} - N_{nonSL} - N_{reserved})$ belongs to the set if $b_{k'} = 1$ where k' = k mod $L_{bitmap}$.

The slots in the set are re-indexed such that the subscripts i of the remaining slots $t_i'^{SL}$ are successive {0, 1, ... , $T'_{max} - 1$} where $T'_{max}$ is the number of the slots remaining in the set.

The UE determines the set of resource blocks assigned to a sidelink resource pool as follows:

The resource block pool consists of $N_{PRB}$ PRBS.

The sub-channel m for m = 0,1,., numSubchannel − 1 consists of a set of $n_{subCHsize}$ contiguous resource blocks with the physical resource block number $n_{PRB} = n_{subCHRBstart} + m \cdot n_{subCHsize} + j$ for j = 0, 1, . . . , $n_{subCHsize} - 1$, where $n_{subCHRBstart}$ and $n_{subCHsize}$ are given by higher layer parameters sl-StartRB-Subchannel and sl-SubchannelSize, respectively A UE is not expected to use the last $N_{PRB}$ mod $n_{subCHsize}$ PRBs in the resource pool.

For example, if the UE selects a transmission resource such that a distance in a time domain between any two reserved resources that can be signaled through one SCI is less than or equal to a specific threshold, HARQ feedback may be disabled for the selected transmission resource. For example, if the UE selects transmission resources based on the resource group. HARQ feedback may be disabled for all other resources except the last resource in the resource group, and HARQ feedback may be enabled for the last resource. For example, if the UE selects transmission resources based on the resource group, HARQ feedback for all transmission resources within the resource group may be the final result of HARQ feedback for the corresponding TB transmitted once through a PSFCH resource after the last transmission resource.

For example, if the UE selects transmission resources based on the resource group, a distance in a time domain between neighboring resource groups may be configured/determined to be greater than or equal to a HARQ RTT value. For example, if some of resources within the resource group conflict with transmission reservation resources of other UEs, the UE may select a SL transmission resource using the remaining resources except for the conflict resource. For example, if some of resources within the resource group conflict with transmission reservation resources of other UEs, the UE may select a transmission resource on behalf of the excluded conflict resource using adjacent SL logical resources preceding the resource group in time or adjacent SL logical resources following the resource group in time, excluding the corresponding conflict resource, and the UE may update the resource group to include the newly selected resource.

For example, for resource selection used for one TB transmission, the UE may select SL transmission resources based on a resource group comprising SL transmission resources in which a distance in a time domain between the temporally earliest transmission resource and the temporally latest transmission resource is less than or equal to a specific threshold. For example, among the resources within the resource group. HARQ feedback may be disabled for resources other than the temporally latest resource, and HARQ feedback may be enabled for the temporally latest resource only. For example, if the UE selects transmission resources based on the resource group, HARQ feedback for all transmission resources within the resource group may be the final result of HARQ feedback for the corresponding TB transmitted once through a PSFCH resource after the last transmission resource.

For example, if the UE selects transmission resources based on the resource group, a distance in a time domain between neighboring resource groups may be configured/determined to be greater than or equal to a HARQ RTT value. For example, if some of resources within the resource group conflict with transmission reservation resources of other UEs, the UE may exclude the conflict resource from the resource group, and the UE may select a new resource within a range in which a distance in a time domain between the resource groups is less than a HARQ RTT value and a distance in a time domain between the first resource and the last resource within the resource groups is within the specific threshold, and the UE may include the new resource in the resource group.

For example, for resource selection used for one TB transmission, the UE may select only SL transmission resources for the TB transmission in which a distance in a time domain between the temporally earliest transmission resource and the temporally latest transmission resource is less than or equal to a specific threshold. For example, the distance in the time domain between the first resource and the last resource in the time domain may be configured to be less than or equal to a SL DRX on-duration/inactivity timer value configured commonly in UE or a SL DRX on-duration/inactivity timer value of the RX UE. For example, the distance in the time domain between the first transmission resource and the last transmission resource of the TX UE in the time domain may be configured to be less than or equal to a SL DRX retransmission timer value configured commonly in UE or a SL DRX retransmission timer value of the RX UE.

For example, in the case of a UE-A transmitting a high priority packet having a priority value less than or equal to a specific threshold value configured in a resource pool, or having a priority value less than or equal to a pre-emption priority value configured in a resource pool, the UE-A may select transmission resources such that a distance in a time domain between any two resources signaled by one SCI is greater than or equal to a specific threshold, in order to allow a UE-B to select a new resource through resource reselection when the UE-B transmitting a low priority packet having a higher priority value than the high priority packet detects a resource conflict with a transmission reservation resource of the UE-A.

Figure 12:
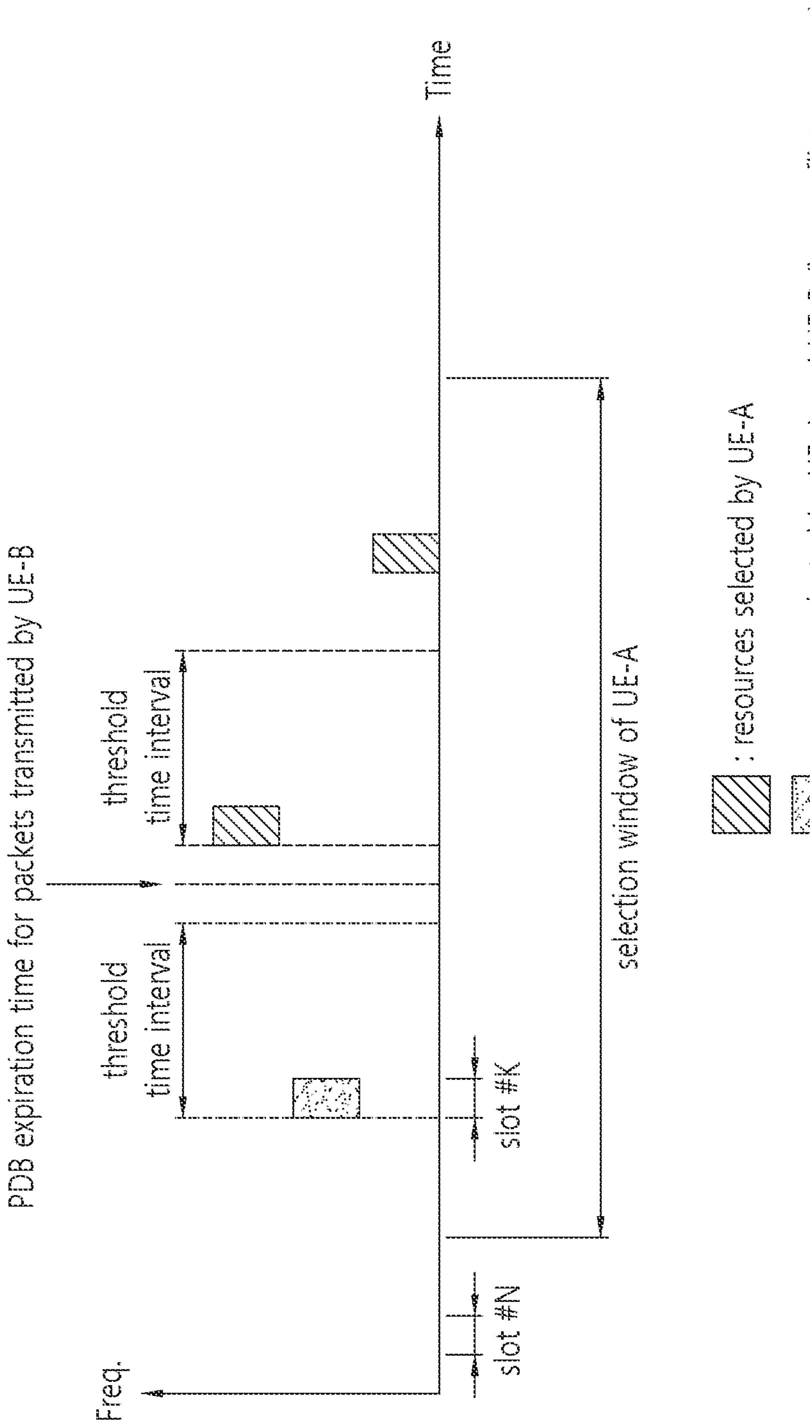
FIG. 12 shows a method for a UE to select or reserve transmission resources such that a distance in a time domain between any two resources is greater than or equal to a specific threshold, based on an embodiment of the present disclosure.

FIG. 12 shows a method for a UE to select or reserve transmission resources such that a distance in a time domain between any two resources is greater than or equal to a specific threshold, based on an embodiment of the present disclosure. The embodiment of FIG. 12 may be combined with various embodiments of the present disclosure.

Referring to FIG. 12, the UE-A may trigger resource selection in a slot #N for transmission of a MAC PDU having a higher priority (i.e., a smaller priority value). In this case, it is assumed that the UE-A selects or reserves transmission resources such that a distance in a time domain between any two resources is greater than or equal to a specific threshold (e.g., a threshold time interval). If a resource reserved by the UE-A and a resource reserved by the UE-B overlap in a slot #K, and if the UE-B performs resource re-evaluation or pre-emption checking on the resource reserved on the slot #K, the UE-B that intends to transmit a MAC PDU with a lower priority (i.e., a larger priority value) should drop the resource reserved on the slot #K and select another resource. In this case, since the UE-A has selected or reserved transmission resources such that the distance in the time domain between any two resources is greater than or equal to the specific threshold (e.g., the threshold time interval), the UE-B may be able to easily obtain another resource within packet delay budget (PDB) related to the MAC PDU. In this way, the reliability of SL transmission by the UE-B transmitting the relatively low priority packet can be ensured.

For example, if periodic transmission is allowed in a resource pool and partial sensing is enabled, and if the UE selects candidate slots within a resource selection window to perform PPS for periodic transmission and performs PPS based on all or part of transmission periods configured in the resource pool with respect to the candidate slots, and if the number of associated candidate slots for which the PPS is performed is less than or equal to the minimum number of candidate slots configured to be a specific threshold, the UE may perform the following operation.

1) (If random resource selection is not configured in the resource pool) the UE may randomly select a transmission resource from a configured exceptional pool.
2) If random resource selection is configured in the resource pool, the UE may randomly select a transmission resource from the resource pool.
3) (If random resource selection is not configured in the resource pool), the UE may select a transmission resource from the resource pool based only on the result of CPS.
4) The UE may drop transmission for the packet.

For example, if the UE selects a transmission resource based on partial sensing, and if the number of candidate slots or candidate resources in which the result of partial sensing is available is less than or equal to a specific threshold or the minimum number of candidate slots Ymin (pre-)configured by the network, the UE may perform the following operation. In this case, for example, the result of partial sensing may include only the result of PPS for resource selection for packets to be transmitted. For example, the result of partial sensing may include only the result of CPS for resource selection for packets to be transmitted. For example, the result of partial sensing may include both the result of CPS and the result of PPS for resource selection for packets to be transmitted. For example, the result of the partial sensing may include only the result of PPS for resource selection for packets to be transmitted and for resource selection for packet transmission other than the resource selection for the packets to be transmitted. For example, the result of the partial sensing may include only the result of CPS for resource selection for packets to be transmitted and for resource selection for packet transmission other than the resource selection for the packets to be transmitted. For example, the result of the partial sensing may include both the result of PPS and the result of CPS for resource selection for packets to be transmitted and for resource selection for packet transmission other than the resource selection for the packets to be transmitted.

1) (If random resource selection is not allowed in the SL resource pool) the UE may randomly select a transmission resource from a configured exceptional pool.
2) If random resource selection is allowed in the SL resource pool, and if a priority value of the packets to be transmitted is less than or equal to a specific threshold, the UE may randomly select a resource from the SL resource pool for transmission.

3) If random resource selection is allowed in the SL resource pool, and if a priority value of the packets to be transmitted is greater than a specific threshold, the UE may randomly select a transmission resource from a configured exceptional pool.

4) If random resource selection is allowed in the SL resource pool, and if a priority value of the packets to be transmitted is greater than a specific threshold, the UE may randomly select a transmission resource from another SL resource pool in which random resource selection is allowed.

5) If random resource selection is allowed in the SL resource pool, and if a priority value of the packets to be transmitted is greater than a specific threshold, the UE may drop transmission of the packets.

6) The UE may drop transmission of the packets.

Based on various embodiments of the present disclosure, the UE performing partial sensing can efficiently select SL transmission resources to minimize power consumption of the UE.

For example, whether the rule is applied and/or the proposed method/rule related parameter value of the present disclosure may be configured/allowed specifically (or differently or independently) for a service type. For example, whether the rule is applied and/or the proposed method/rule related parameter value of the present disclosure may be configured/allowed specifically (or differently or independently) for a (LCH or service) priority. For example, whether the rule is applied and/or the proposed method/rule related parameter value of the present disclosure may be configured/allowed specifically (or differently or independently) for a QoS requirement (e.g., latency, reliability, minimum communication range). For example, whether the rule is applied and/or the proposed method/rule related parameter value of the present disclosure may be configured/allowed specifically (or differently or independently) for a PQI parameter. For example, whether the rule is applied and/or the proposed method/rule related parameter value of the present disclosure may be configured/allowed specifically (or differently or independently) for a HARQ feedback ENABLED LCH/MAC PDU (transmission). For example, whether the rule is applied and/or the proposed method/rule related parameter value of the present disclosure may be configured/allowed specifically (or differently or independently) for a HARQ feedback DISABLED LCH/MAC PDU (transmission). For example, whether the rule is applied and/or the proposed method/rule related parameter value of the present disclosure may be configured/allowed specifically (or differently or independently) for a CBR measurement value of a resource pool. For example, whether the rule is applied and/or the proposed method/rule related parameter value of the present disclosure may be configured/allowed specifically (or differently or independently) for a SL cast type (e.g., unicast, groupcast, broadcast). For example, whether the rule is applied and/or the proposed method/rule related parameter value of the present disclosure may be configured/allowed specifically (or differently or independently) for a SL groupcast HARQ feedback option (e.g., NACK only feedback, ACK/NACK feedback, NACK only feedback based on TX-RX distance). For example, whether the rule is applied and/or the proposed method/rule related parameter value of the present disclosure may be configured/allowed specifically (or differently or independently) for a SL mode 1 CG type (e.g., SL CG type 1 or SL CG type 2). For example, whether the rule is applied and/or the proposed method/rule related parameter value of the present disclosure may be configured/allowed specifically (or differently or independently) for a SL mode type (e.g., mode 1 or mode 2). For example, whether the rule is applied and/or the proposed method/rule related parameter value of the present disclosure may be configured/allowed specifically (or differently or independently) for a resource pool. For example, whether the rule is applied and/or the proposed method/rule related parameter value of the present disclosure may be configured/allowed specifically (or differently or independently) for whether a PSFCH resource is a configured resource pool. For example, whether the rule is applied and/or the proposed method/rule related parameter value of the present disclosure may be configured/allowed specifically (or differently or independently) for a source (L2) ID. For example, whether the rule is applied and/or the proposed method/rule related parameter value of the present disclosure may be configured/allowed specifically (or differently or independently) for a destination (L2) ID. For example, whether the rule is applied and/or the proposed method/rule related parameter value of the present disclosure may be configured/allowed specifically (or differently or independently) for a PC5 RRC connection link. For example, whether the rule is applied and/or the proposed method/rule related parameter value of the present disclosure may be configured/allowed specifically (or differently or independently) for a SL link. For example, whether the rule is applied and/or the proposed method/rule related parameter value of the present disclosure may be configured/allowed specifically (or differently or independently) for a connection state (e.g., RRC CONNECTED state, IDLE state, INACTIVE state) (with a base station). For example, whether the rule is applied and/or the proposed method/rule related parameter value of the present disclosure may be configured/allowed specifically (or differently or independently) for a SL HARQ process (ID). For example, whether the rule is applied and/or the proposed method/rule related parameter value of the present disclosure may be configured/allowed specifically (or differently or independently) for whether to perform SL DRX operation (of TX UE or RX UE). For example, whether the rule is applied and/or the proposed method/rule related parameter value of the present disclosure may be configured/allowed specifically (or differently or independently) for whether a power saving (TX or RX) UE. For example, whether the rule is applied and/or the proposed method/rule related parameter value of the present disclosure may be configured/allowed specifically (or differently or independently) for a case where (from a specific UE perspective) PSFCH TX and PSFCH RX (and/or a plurality of PSFCH TX (exceeding UE capabilities)) overlap (and/or PSFCH TX (and/or PSFCH RX) is omitted). For example, whether the rule is applied and/or the proposed method/rule related parameter value of the present disclosure may be configured/allowed specifically (or differently or independently) for a case where the RX UE actually (successfully) receives PSCCH (and/or PSSCH) (re)transmission from the TX UE.

For example, in the present disclosure, the term "configure/configured (or designate/designated)" may be extended and interpreted as a form in which the base station informs the UE through a pre-defined (physical layer or higher layer) channel/signal (e.g., SIB, RRC, MAC CE) (and/or a form in which the UE informs other UEs through a pre-defined (physical layer or higher layer) channel/signal (e.g., SL MAC CE, PC5 RRC)).

For example, in the present disclosure, the term "PSFCH" may be extended and interpreted as (NR or LTE) PSSCH (and/or (NR or LTE) PSCCH)(and/or (NR or LTE) SL SSB (and/or UL channel/signal)). In addition, the proposed methods of the present disclosure may be used in combination with each other (as a new type).

Figure 13:
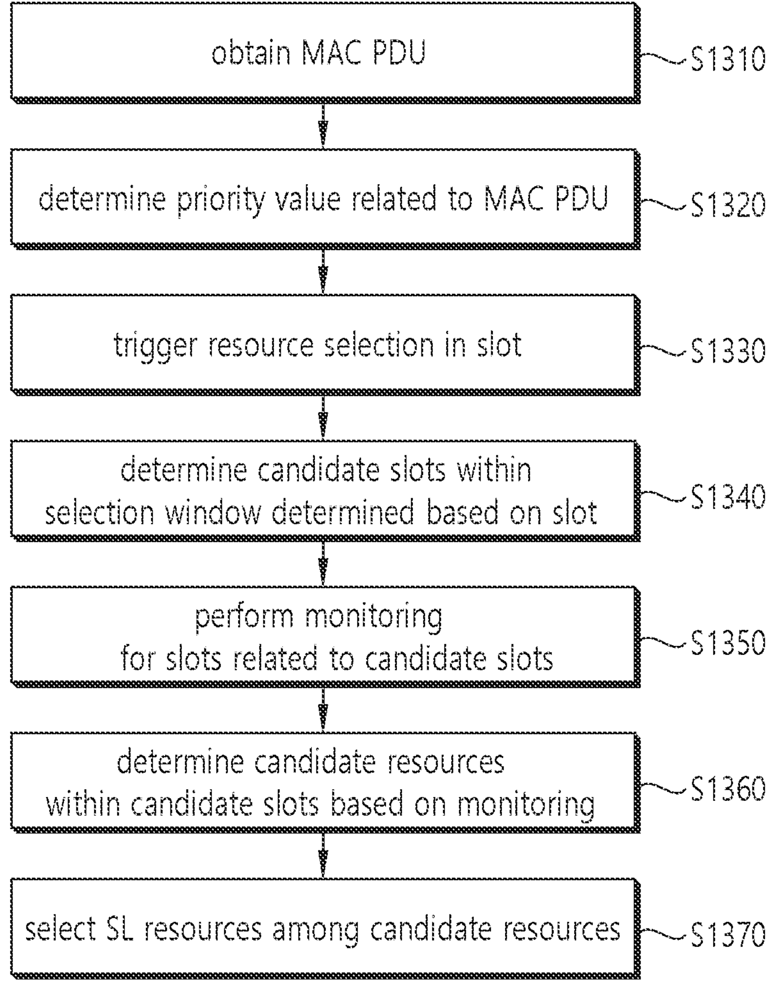
FIG. 13 shows a method for a first device to perform wireless communication, based on an embodiment of the present disclosure.

For example, in the present disclosure, a specific threshold may refer to a threshold pre-defined or (pre-)configured by the network or the base station or the upper layer (including the application layer) of the UE. For example, in the present disclosure, a specific configured threshold may refer to a value pre-defined or (pre-)configured by the network or the base station or the upper layer (including the application layer) of the UE. For example, the operation configured by the network/base station may refer to the operation in which the base station (pre-)configures to the UE through higher layer RRC signaling, configures/signals to the UE through MAC CE, or signals the UE through DCL FIG. 13 shows a method for a first device to perform wireless communication, based on an embodiment of the present disclosure. The embodiment of FIG. 13 may be combined with various embodiments of the present disclosure.

Referring to FIG. 13, in step S1310, the first device may obtain a media access control (MAC) protocol data unit (PDU). In step S1320, the first device may determine a priority value related to the MAC PDU. In step S1330, the first device may trigger resource selection in a slot. In step S1340, the first device may determine a plurality of candidate slots within a selection window determined based on the slot. In step S1350, the first device may perform monitoring for a plurality of slots related to the plurality of candidate slots. In step S1360, the first device may determine a plurality of candidate resources within the plurality of candidate slots based on the monitoring. In step S1370, the first device may select a plurality of sidelink (SL) resources among the plurality of candidate resources. For example, a time interval between the plurality of SL resources may be determined based on the priority value related to the MAC PDU.

For example, based on that the priority value is less than or equal to a threshold priority value, the time interval between the plurality of SL resources may be determined to be greater than or equal to a threshold time interval. For example, the threshold priority value may be configured for a resource pool.

For example, based on that the priority value is less than or equal to a threshold priority value, the first device may select the plurality of SL resources such that the time interval between the plurality of SL resources is greater than or equal to a threshold time interval.

For example, based on that the priority value is greater than a threshold priority value, the time interval between the plurality of SL resources may be determined regardless of a threshold time interval.

For example, the time interval between the plurality of SL resources may be determined based on a resource selection method of the first device. For example, based on that the resource selection method is a partial sensing-based resource selection method or a random selection-based resource selection method, the time interval between the plurality of SL resources may be determined to be less than or equal to a threshold time interval. For example, the threshold time interval may be configured to be greater than or equal to a hybrid automatic repeat request (HARQ) round-trip time (RTT) time.

For example, based on that the time interval between the plurality of SL resources is less than or equal to a threshold time interval, HARQ feedback may be enabled for transmission on a last resource of the plurality of SL resources, and HARQ feedback may be disabled for transmission on remaining resources of the plurality of SL resources. For example, the plurality of SL resources may be included in a resource group for same transport block (TB) transmission.

For example, based on that a number of the plurality of candidate slots is less than or equal to a minimum number of candidate slots, the plurality of SL resources may be selected based on random selection from a resource pool or an exceptional resource pool.

For example, based on that a number of candidate slots in which a result of partial sensing is available among the plurality of candidate slots is less than or equal to a minimum number of candidate slots, the plurality of SL resources may be selected based on random selection from a resource pool or an exceptional resource pool.

For example, based on that a number of candidate resources in which a result of partial sensing is available among the plurality of candidate slots is less than or equal to a minimum number of candidate resources, the plurality of SL resources may be selected based on random selection from a resource pool or an exceptional resource pool.

For example, a time interval between a first SL resource and a last SL resource among the plurality of SL resources may be selected to be less than or equal to a value of a SL discontinuous reception (DRX) retransmission timer configured for the first device or a receiving device related to the first device.

The proposed method can be applied to the device(s) based on various embodiments of the present disclosure. First, the processor 102 of the first device 100 may obtain a media access control (MAC) protocol data unit (PDU). In addition, the processor 102 of the first device 100 may determine a priority value related to the MAC PDU. In addition, the processor 102 of the first device 100 may trigger resource selection in a slot. In addition, the processor 102 of the first device 100 may determine a plurality of candidate slots within a selection window determined based on the slot. In addition, the processor 102 of the first device 100 may perform monitoring for a plurality of slots related to the plurality of candidate slots. In addition, the processor 102 of the first device 100 may determine a plurality of candidate resources within the plurality of candidate slots based on the monitoring. In addition, the processor 102 of the first device 100 may select a plurality of sidelink (SL) resources among the plurality of candidate resources. For example, a time interval between the plurality of SL resources may be determined based on the priority value related to the MAC PDU.

Based on an embodiment of the present disclosure, a first device adapted to perform wireless communication may be provided. For example, the first device may comprise: one or more memories storing instructions; one or more transceivers; and one or more processors connected to the one or more memories and the one or more transceivers. For example, the one or more processors may execute the instructions to: obtain a media access control (MAC) protocol data unit (PDU); determine a priority value related to the MAC PDU; trigger resource selection in a slot: determine a plurality of candidate slots within a selection window determined based on the slot: perform monitoring for a plurality of slots related to the plurality of candidate slots; determine a plurality of candidate resources within the plurality of candidate slots based on the monitoring; and select a plurality of sidelink (SL) resources among the plurality of candidate resources. For example, a time interval between the plurality of SL resources may be determined based on the priority value related to the MAC PDU.

Based on an embodiment of the present disclosure, an apparatus adapted to control a first user equipment (UE) may be provided. For example, the apparatus may comprise: one or more processors; and one or more memories operably connected to the one or more processors and storing instructions. For example, the one or more processors may execute the instructions to: obtain a media access control (MAC) protocol data unit (PDU); determine a priority value related to the MAC PDU: trigger resource selection in a slot; determine a plurality of candidate slots within a selection window determined based on the slot; perform monitoring for a plurality of slots related to the plurality of candidate slots; determine a plurality of candidate resources within the plurality of candidate slots based on the monitoring; and select a plurality of sidelink (SL) resources among the plurality of candidate resources. For example, a time interval between the plurality of SL resources may be determined based on the priority value related to the MAC PDU.

Based on an embodiment of the present disclosure, a non-transitory computer-readable storage medium storing instructions may be provided. For example, the non-transitory computer-readable storage medium storing instructions, when executed, may cause a first device to: obtain a media access control (MAC) protocol data unit (PDU); determine a priority value related to the MAC PDU; trigger resource selection in a slot; determine a plurality of candidate slots within a selection window determined based on the slot; perform monitoring for a plurality of slots related to the plurality of candidate slots; determine a plurality of candidate resources within the plurality of candidate slots based on the monitoring: and select a plurality of sidelink (SL) resources among the plurality of candidate resources. For example, a time interval between the plurality of SL resources may be determined based on the priority value related to the MAC PDU.

Figure 14:
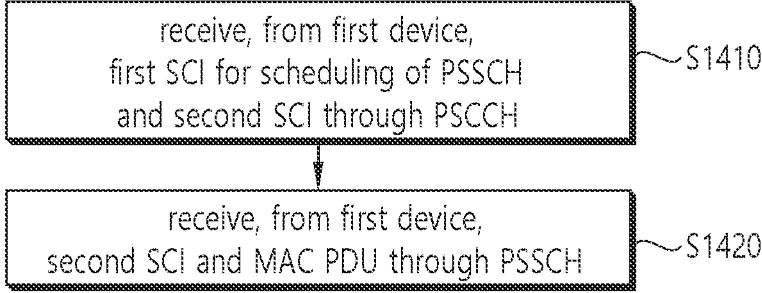
FIG. 14 shows a method for a second device to perform wireless communication, based on an embodiment of the present disclosure.

FIG. 14 shows a method for a second device to perform wireless communication, based on an embodiment of the present disclosure. The embodiment of FIG. 14 may be combined with various embodiments of the present disclosure.

Referring to FIG. 14, in step S1410, the second device may receive, from a first device, first sidelink control information (SCI) for scheduling of a physical sidelink shared channel (PSSCH) and second SCI through a physical sidelink control channel (PSCCH). In step S1420, the second device may receive, from the first device, the second SCI and a media access control (MAC) protocol data unit (PDU) through the PSSCH. For example, the MAC PDU may be obtained by the first device, and a priority value related to the MAC PDU may be determined by the first device, and resource selection may be triggered by the first device in a slot, and a plurality of candidate slots may be determined by the first device within a selection window determined based on the slot, and monitoring of a plurality of slots related to the plurality of candidate slots may be performed by the first device, and a plurality of candidate resources may be determined by the first device within the plurality of candidate slots based on the monitoring, and a plurality of sidelink (SL) resources may be selected by the first device among the plurality of candidate resources, and a time interval between the plurality of SL resources may be determined based on the priority value related to the MAC PDU.

For example, based on that the priority value is less than or equal to a threshold priority value, the time interval between the plurality of SL resources may be determined to be greater than or equal to a threshold time interval. For example, the threshold priority value may be configured for a resource pool.

For example, based on that the priority value is less than or equal to a threshold priority value, the first device may select the plurality of SL resources such that the time interval between the plurality of SL resources is greater than or equal to a threshold time interval.

For example, based on that the priority value is greater than a threshold priority value, the time interval between the plurality of SL resources may be determined regardless of a threshold time interval.

For example, the time interval between the plurality of SL resources may be determined based on a resource selection method of the first device. For example, based on that the resource selection method is a partial sensing-based resource selection method or a random selection-based resource selection method, the time interval between the plurality of SL resources may be determined to be less than or equal to a threshold time interval. For example, the threshold time interval may be configured to be greater than or equal to a hybrid automatic repeat request (HARQ) round-trip time (RTT) time.

For example, based on that the time interval between the plurality of SL resources is less than or equal to a threshold time interval, HARQ feedback may be enabled for transmission on a last resource of the plurality of SL resources, and HARQ feedback may be disabled for transmission on remaining resources of the plurality of SL resources. For example, the plurality of SL resources may be included in a resource group for same transport block (TB) transmission.

For example, based on that a number of the plurality of candidate slots is less than or equal to a minimum number of candidate slots, the plurality of SL resources may be selected based on random selection from a resource pool or an exceptional resource pool.

For example, based on that a number of candidate slots in which a result of partial sensing is available among the plurality of candidate slots is less than or equal to a minimum number of candidate slots, the plurality of SL resources may be selected based on random selection from a resource pool or an exceptional resource pool.

For example, based on that a number of candidate resources in which a result of partial sensing is available among the plurality of candidate slots is less than or equal to a minimum number of candidate resources, the plurality of SL resources may be selected based on random selection from a resource pool or an exceptional resource pool.

For example, a time interval between a first SL resource and a last SL resource among the plurality of SL resources may be selected to be less than or equal to a value of a SL discontinuous reception (DRX) retransmission timer configured for the first device or a receiving device related to the first device.

The proposed method can be applied to the device(s) based on various embodiments of the present disclosure. First, the processor 202 of the second device 200 may control the transceiver 206 to receive, from a first device, first sidelink control information (SCI) for scheduling of a physical sidelink shared channel (PSSCH) and second SCI through a physical sidelink control channel (PSCCH). In addition, the processor 202 of the second device 200 may control the transceiver 206 to receive, from the first device, the second SCI and a media access control (MAC) protocol data unit (PDU) through the PSSCH. For example, the MAC PDU may be obtained by the first device, and a priority value related to the MAC PDU may be determined by the first device, and resource selection may be triggered by the first device in a slot, and a plurality of candidate slots may be determined by the first device within a selection window determined based on the slot, and monitoring of a plurality of slots related to the plurality of candidate slots may be performed by the first device, and a plurality of candidate resources may be determined by the first device within the plurality of candidate slots based on the monitoring, and a plurality of sidelink (SL) resources may be selected by the first device among the plurality of candidate resources, and a time interval between the plurality of SL resources may be determined based on the priority value related to the MAC PDU.

Based on an embodiment of the present disclosure, a second device adapted to perform wireless communication may be provided. For example, the second device may comprise: one or more memories storing instructions; one or more transceivers; and one or more processors connected to the one or more memories and the one or more transceivers. For example, the one or more processors may execute the instructions to: receive, from a first device, first sidelink control information (SCI) for scheduling of a physical sidelink shared channel (PSSCH) and second SCI through a physical sidelink control channel (PSCCH); and receive, from the first device, the second SCI and a media access control (MAC) protocol data unit (PDU) through the PSSCH. For example, the MAC PDU may be obtained by the first device, and a priority value related to the MAC PDU may be determined by the first device, and resource selection may be triggered by the first device in a slot, and a plurality of candidate slots may be determined by the first device within a selection window determined based on the slot, and monitoring of a plurality of slots related to the plurality of candidate slots may be performed by the first device, and a plurality of candidate resources may be determined by the first device within the plurality of candidate slots based on the monitoring, and a plurality of sidelink (SL) resources may be selected by the first device among the plurality of candidate resources, and a time interval between the plurality of SL resources may be determined based on the priority value related to the MAC PDU.

Based on an embodiment of the present disclosure, an apparatus adapted to control a second user equipment (UE) may be provided. For example, the apparatus may comprise: one or more processors; and one or more memories operably connected to the one or more processors and storing instructions. For example, the one or more processors may execute the instructions to: receive, from a first UE, first sidelink control information (SCI) for scheduling of a physical sidelink shared channel (PSSCH) and second SCI through a physical sidelink control channel (PSCCH); and receive, from the first UE, the second SCI and a media access control (MAC) protocol data unit (PDU) through the PSSCH. For example, the MAC PDU may be obtained by the first UE, and a priority value related to the MAC PDU may be determined by the first UE, and resource selection may be triggered by the first UE in a slot, and a plurality of candidate slots may be determined by the first UE within a selection window determined based on the slot, and monitoring of a plurality of slots related to the plurality of candidate slots may be performed by the first UE, and a plurality of candidate resources may be determined by the first UE within the plurality of candidate slots based on the monitoring, and a plurality of sidelink (SL) resources may be selected by the first UE among the plurality of candidate resources, and a time interval between the plurality of SL resources may be determined based on the priority value related to the MAC PDU.

Based on an embodiment of the present disclosure, a non-transitory computer-readable storage medium storing instructions may be provided. For example, the non-transitory computer-readable storage medium storing instructions, when executed, may cause a second device to: receive, from a first device, first sidelink control information (SCI) for scheduling of a physical sidelink shared channel (PSSCH) and second SCI through a physical sidelink control channel (PSCCH); and receive, from the first device, the second SCI and a media access control (MAC) protocol data unit (PDU) through the PSSCH. For example, the MAC PDU may be obtained by the first device, and a priority value related to the MAC PDU may be determined by the first device, and resource selection may be triggered by the first device in a slot, and a plurality of candidate slots may be determined by the first device within a selection window determined based on the slot, and monitoring of a plurality of slots related to the plurality of candidate slots may be performed by the first device, and a plurality of candidate resources may be determined by the first device within the plurality of candidate slots based on the monitoring, and a plurality of sidelink (SL) resources may be selected by the first device among the plurality of candidate resources, and a time interval between the plurality of SL resources may be determined based on the priority value related to the MAC PDU.

Various embodiments of the present disclosure may be combined with each other.

Hereinafter, device(s) to which various embodiments of the present disclosure can be applied will be described.

The various descriptions, functions, procedures, proposals, methods, and/or operational flowcharts of the present disclosure described in this document may be applied to, without being limited to, a variety of fields requiring wireless communication/connection (e.g., 5G) between devices.

Hereinafter, a description will be given in more detail with reference to the drawings. In the following drawings/description, the same reference symbols may denote the same or corresponding hardware blocks, software blocks, or functional blocks unless described otherwise.

Figure 15:
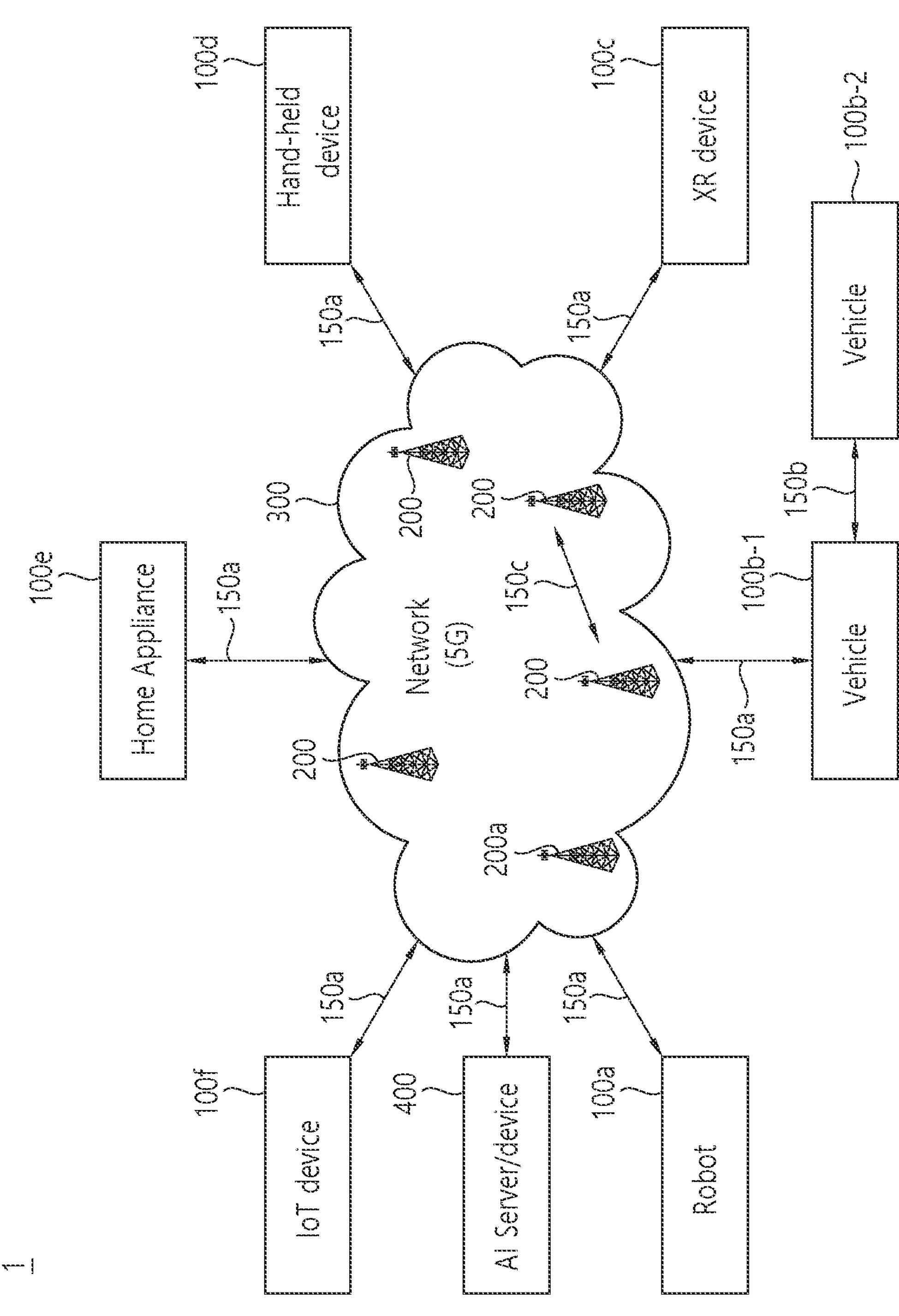
FIG. 15 shows a communication system 1, based on an embodiment of the present disclosure.

FIG. 15 shows a communication system 1, based on an embodiment of the present disclosure. The embodiment of FIG. 15 may be combined with various embodiments of the present disclosure.

Referring to FIG. 15, a communication system 1 to which various embodiments of the present disclosure are applied includes wireless devices, Base Stations (BSs), and a network. Herein, the wireless devices represent devices performing communication using Radio Access Technology (RAT) (e.g., 5G New RAT (NR)) or Long-Term Evolution (LTE)) and may be referred to as communication/radio/5G devices. The wireless devices may include, without being limited to, a robot 100*a*, vehicles 100*b*-1 and 100*b*-2, an eXtended Reality (XR) device 100*c*, a hand-held device 100*d*, a home appliance 100*e*, an Internet of Things (IoT) device 100*f*, and an Artificial Intelligence (AI) device/server 400. For example, the vehicles may include a vehicle having a wireless communication function, an autonomous vehicle, and a vehicle capable of performing communication between vehicles. Herein, the vehicles may include an Unmanned Aerial Vehicle (UAV) (e.g., a drone). The XR device may include an Augmented Reality (AR)/Virtual Reality (VR)/Mixed Reality (MR) device and may be implemented in the form of a Head-Mounted Device (HMD), a Head-Up Display (HUD) mounted in a vehicle, a television, a smartphone, a computer, a wearable device, a home appliance device, a digital signage, a vehicle, a robot, etc. The hand-held device may include a smartphone, a smartpad, a wearable device (e.g., a smartwatch or a smartglasses), and a computer (e.g., a notebook). The home appliance may include a TV, a refrigerator, and a washing machine. The IoT device may include a sensor and a smartmeter. For example, the BSs and the network may be implemented as wireless devices and a specific wireless device 200*a* may operate as a BS/network node with respect to other wireless devices.

Here, wireless communication technology implemented in wireless devices 100*a* to 100*f* of the present disclosure may include Narrowband Internet of Things for low-power communication in addition to LTE, NR, and 6G. In this case, for example, NB-IoT technology may be an example of Low Power Wide Area Network (LPWAN) technology and may be implemented as standards such as LTE Cat NB1, and/or LTE Cat NB2, and is not limited to the name described above. Additionally or alternatively, the wireless communication technology implemented in the wireless devices 100*a* to 100*f* of the present disclosure may perform communication based on LTE-M technology. In this case, as an example, the LTE-M technology may be an example of the LPWAN and may be called by various names including enhanced Machine Type Communication (eMTC), and the like. For example, the LTE-M technology may be implemented as at least any one of various standards such as 1) LTE CAT 0, 2) LTE Cat M1, 3) LTE Cat M2, 4) LTE non-Bandwidth Limited (non-BL), 5) LTE-MTC, 6) LTE Machine Type Communication, and/or 7) LTE M, and is not limited to the name described above. Additionally or alternatively, the wireless communication technology implemented in the wireless devices 100*a* to 100*f* of the present disclosure may include at least one of Bluetooth, Low Power Wide Area Network (LPWAN), and ZigBee considering the low-power communication, and is not limited to the name described above. As an example, the ZigBee technology may generate personal area networks (PAN) related to small/low-power digital communication based on various standards including IEEE 802.15.4, and the like, and may be called by various names.

The wireless devices 100*a* to 100*f* may be connected to the network 300 via the BSs 200. An AI technology may be applied to the wireless devices 100*a* to 100*f* and the wireless devices 100*a* to 100*f* may be connected to the AI server 400 via the network 300. The network 300 may be configured using a 3G network, a 4G (e.g., LTE) network, or a 5G (e.g., NR) network. Although the wireless devices 100*a* to 100*f* may communicate with each other through the BSs 200/network 300, the wireless devices 100*a* to 100*f* may perform direct communication (e.g., sidelink communication) with each other without passing through the BSs/network. For example, the vehicles 100*b*-1 and 100*b*-2 may perform direct communication (e.g. Vehicle-to-Vehicle (V2V)/Vehicle-to-everything (V2X) communication). The IoT device (e.g., a sensor) may perform direct communication with other IoT devices (e.g., sensors) or other wireless devices 100*a* to 100*f*.

Wireless communication/connections 150*a*, 150*b*, or 150*c* may be established between the wireless devices 100*a* to 100*f*/BS 200, or BS 200/BS 200. Herein, the wireless communication/connections may be established through various RATs (e.g., 5G NR) such as uplink/downlink communication 150*a*, sidelink communication 150*b* (or, D2D communication), or inter BS communication (e.g. relay, Integrated Access Backhaul (IAB)). The wireless devices and the BSs/the wireless devices may transmit/receive radio signals to/from each other through the wireless communication/connections 150*a* and 150*b*. For example, the wireless communication/connections 150*a* and 150*b* may transmit/receive signals through various physical channels. To this end, at least a part of various configuration information configuring processes, various signal processing processes (e.g., channel encoding/decoding, modulation/demodulation, and resource mapping/demapping), and resource allocating processes, for transmitting/receiving radio signals, may be performed based on the various proposals of the present disclosure.

Figure 16:
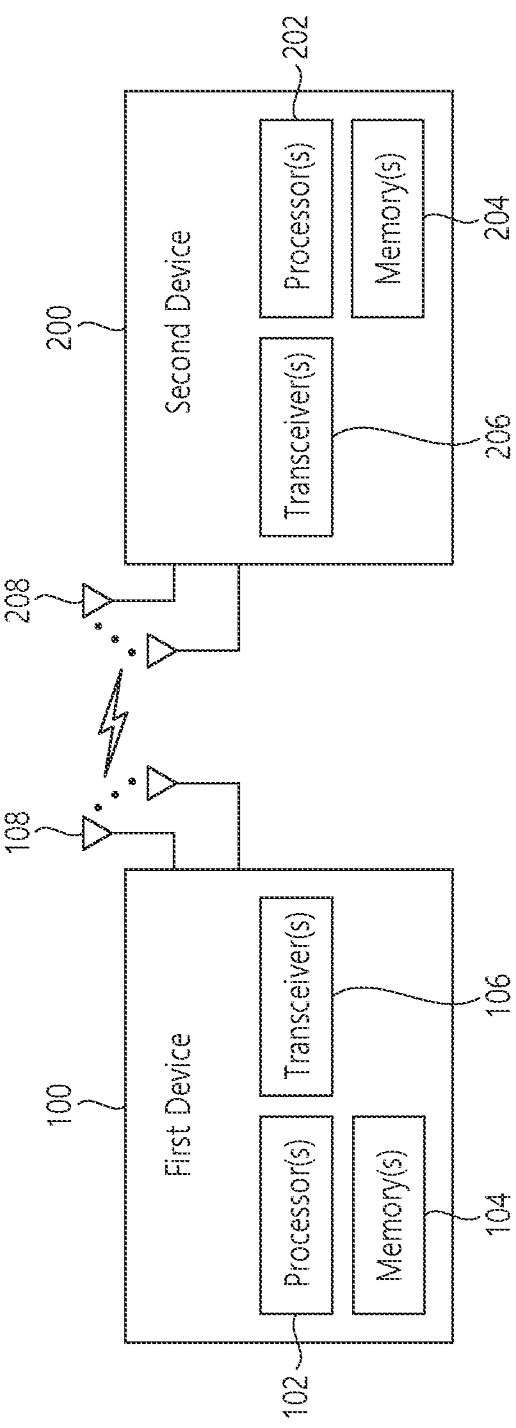
FIG. 16 shows wireless devices, based on an embodiment of the present disclosure.

FIG. 16 shows wireless devices, based on an embodiment of the present disclosure. The embodiment of FIG. 16 may be combined with various embodiments of the present disclosure.

Referring to FIG. 16, a first wireless device 100 and a second wireless device 200 may transmit radio signals through a variety of RATs (e.g., LTE and NR). Herein, {the first wireless device 100 and the second wireless device 200} may correspond to {the wireless device 100*x* and the BS 200} and/or {the wireless device 100*x* and the wireless device 100*x*} of FIG. 15.

The first wireless device 100 may include one or more processors 102 and one or more memories 104 and additionally further include one or more transceivers 106 and/or one or more antennas 108. The processor(s) 102 may control the memory(s) 104 and/or the transceiver(s) 106 and may be configured to implement the descriptions, functions, procedures, proposals, methods, and/or operational flowcharts disclosed in this document. For example, the processor(s) 102 may process information within the memory(s) 104 to generate first information/signals and then transmit radio signals including the first information/signals through the transceiver(s) 106. The processor(s) 102 may receive radio signals including second information/signals through the transceiver 106 and then store information obtained by processing the second information/signals in the memory(s) 104. The memory(s) 104 may be connected to the processor(s) 102 and may store a variety of information related to operations of the processor(s) 102. For example, the memory(s) 104 may store software code including commands for performing a part or the entirety of processes controlled by the processor(s) 102 or for performing the descriptions, functions, procedures, proposals, methods, and/or operational flowcharts disclosed in this document. Herein, the processor(s) 102 and the memory(s) 104 may be a part of a communication modem/circuit/chip designed to implement RAT (e.g., LTE or NR). The transceiver(s) 106 may be connected to the processor(s) 102 and transmit and/or receive radio signals through one or more antennas 108. Each of the transceiver(s) 106 may include a transmitter and/or a receiver. The transceiver(s) 106 may be interchangeably used with Radio Frequency (RF) unit(s). In the present disclosure, the wireless device may represent a communication modem/circuit/chip.

The second wireless device 200 may include one or more processors 202 and one or more memories 204 and additionally further include one or more transceivers 206 and/or one or more antennas 208. The processor(s) 202 may control the memory(s) 204 and/or the transceiver(s) 206 and may be configured to implement the descriptions, functions, procedures, proposals, methods, and/or operational flowcharts disclosed in this document. For example, the processor(s) 202 may process information within the memory(s) 204 to generate third information/signals and then transmit radio signals including the third information/signals through the transceiver(s) 206. The processor(s) 202 may receive radio signals including fourth information/signals through the transceiver(s) 106 and then store information obtained by processing the fourth information/signals in the memory(s) 204. The memory(s) 204 may be connected to the processor (s) 202 and may store a variety of information related to operations of the processor(s) 202. For example, the memory(s) 204 may store software code including commands for performing a part or the entirety of processes controlled by the processor(s) 202 or for performing the descriptions, functions, procedures, proposals, methods, and/or operational flowcharts disclosed in this document. Herein, the processor(s) 202 and the memory(s) 204 may be a part of a communication modem/circuit/chip designed to implement RAT (e.g., LTE or NR). The transceiver(s) 206 may be connected to the processor(s) 202 and transmit and/or receive radio signals through one or more antennas 208. Each of the transceiver(s) 206 may include a transmitter and/or a receiver. The transceiver(s) 206 may be interchangeably used with RF unit(s). In the present disclosure, the wireless device may represent a communication modem/circuit/chip.

Hereinafter, hardware elements of the wireless devices 100 and 200 will be described more specifically. One or more protocol layers may be implemented by, without being limited to, one or more processors 102 and 202. For example, the one or more processors 102 and 202 may implement one or more layers (e.g., functional layers such as PHY, MAC, RLC, PDCP, RRC, and SDAP). The one or more processors 102 and 202 may generate one or more Protocol Data Units (PDUs) and/or one or more Service Data Unit (SDUs) according to the descriptions, functions, procedures, proposals, methods, and/or operational flowcharts disclosed in this document. The one or more processors 102 and 202 may generate messages, control information, data, or information according to the descriptions, functions, procedures, proposals, methods, and/or operational flowcharts disclosed in this document. The one or more processors 102 and 202 may generate signals (e.g., baseband signals) including PDUs, SDUs, messages, control information, data, or information according to the descriptions, functions, procedures, proposals, methods, and/or operational flowcharts disclosed in this document and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the descriptions, functions, procedures, proposals, methods, and/or operational flowcharts disclosed in this document.

The one or more processors 102 and 202 may be referred to as controllers, microcontrollers, microprocessors, or microcomputers. The one or more processors 102 and 202 may be implemented by hardware, firmware, software, or a combination thereof. As an example, one or more Application Specific Integrated Circuits (ASICs), one or more Digital Signal Processors (DSPs), one or more Digital Signal Processing Devices (DSPDs), one or more Programmable Logic Devices (PLDs), or one or more Field Programmable Gate Arrays (FPGAs) may be included in the one or more processors 102 and 202. The descriptions, functions, procedures, proposals, methods, and/or operational flowcharts disclosed in this document may be implemented using firmware or software and the firmware or software may be configured to include the modules, procedures, or functions. Firmware or software configured to perform the descriptions, functions, procedures, proposals, methods, and/or operational flowcharts disclosed in this document may be included in the one or more processors 102 and 202 or stored in the one or more memories 104 and 204 so as to be driven by the one or more processors 102 and 202. The descriptions, functions, procedures, proposals, methods, and/or operational flowcharts disclosed in this document may be implemented using firmware or software in the form of code, commands, and/or a set of commands.

The one or more memories 104 and 204 may be connected to the one or more processors 102 and 202 and store various types of data, signals, messages, information, programs, code, instructions, and/or commands. The one or more memories 104 and 204 may be configured by Read-Only Memories (ROMs), Random Access Memories (RAMs), Electrically Erasable Programmable Read-Only Memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or radio signals/channels, mentioned in the methods and/or operational flowcharts of this document, to one or more other devices. The one or more transceivers 106 and 206 may receive user data, control information, and/or radio signals/channels, mentioned in the descriptions, functions, procedures, proposals, methods, and/or operational flowcharts disclosed in this document, from one or more other devices. For example, the one or more transceivers 106 and 206 may be connected to the one or more processors 102 and 202 and transmit and receive radio signals. For example, the one or more processors 102 and 202 may perform control so that the one or more transceivers 106 and 206 may transmit user data, control information, or radio signals to one or more other devices. The one or more processors 102 and 202 may perform control so that the one or more transceivers 106 and 206 may receive user data, control information, or radio signals from one or more other devices. The one or more transceivers 106 and 206 may be connected to the one or more antennas 108 and 208 and the one or more transceivers 106 and 206 may be configured to transmit and receive user data, control information, and/or radio signals/channels, mentioned in the descriptions, functions, procedures, proposals, methods, and/or operational flowcharts disclosed in this document, through the one or more antennas 108 and 208. In this document, the one or more antennas may be a plurality of physical antennas or a plurality of logical antennas (e.g., antenna ports). The one or more transceivers 106 and 206 may convert received radio signals/channels etc. from RF band signals into baseband signals in order to process received user data, control information, radio signals/channels, etc. using the one or more processors 102 and 202. The one or more transceivers 106 and 206 may convert the user data, control information, radio signals/channels, etc. processed using the one or more processors 102 and 202 from the base band signals into the RF band signals. To this end, the one or more transceivers 106 and 206 may include (analog) oscillators and/or filters.

Figure 17:
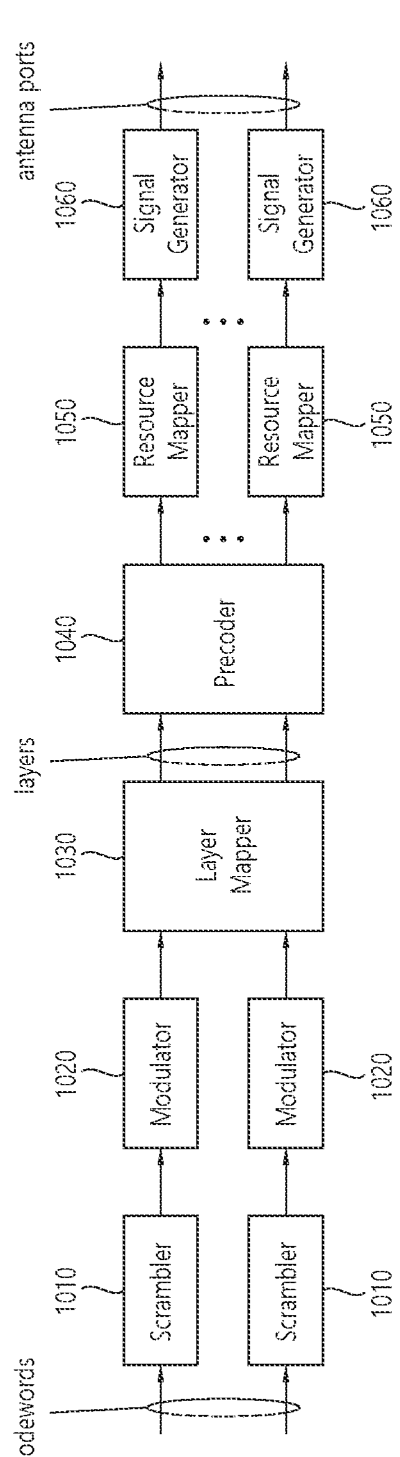
FIG. 17 shows a signal process circuit for a transmission signal, based on an embodiment of the present disclosure.

FIG. 17 shows a signal process circuit for a transmission signal, based on an embodiment of the present disclosure. The embodiment of FIG. 17 may be combined with various embodiments of the present disclosure.

Referring to FIG. 17, a signal processing circuit 1000 may include scramblers 1010, modulators 1020, a layer mapper 1030, a precoder 1040, resource mappers 1050, and signal generators 1060. An operation/function of FIG. 17 may be performed, without being limited to, the processors 102 and 202 and/or the transceivers 106 and 206 of FIG. 16. Hardware elements of FIG. 17 may be implemented by the processors 102 and 202 and/or the transceivers 106 and 206 of FIG. 16. For example, blocks 1010 to 1060 may be implemented by the processors 102 and 202 of FIG. 16. Alternatively, the blocks 1010 to 1050 may be implemented by the processors 102 and 202 of FIG. 16 and the block 1060 may be implemented by the transceivers 106 and 206 of FIG. 16.

Codewords may be converted into radio signals via the signal processing circuit 1000 of FIG. 17. Herein, the codewords are encoded bit sequences of information blocks. The information blocks may include transport blocks (e.g., a UL-SCH transport block, a DL-SCH transport block). The radio signals may be transmitted through various physical channels (e.g., a PUSCH and a PDSCH).

Specifically, the codewords may be converted into scrambled bit sequences by the scramblers 1010. Scramble sequences used for scrambling may be generated based on an initialization value, and the initialization value may include ID information of a wireless device. The scrambled bit sequences may be modulated to modulation symbol sequences by the modulators 1020. A modulation scheme may include pi/2-Binary Phase Shift Keying (pi/2-BPSK), m-Phase Shift Keying (m-PSK), and m-Quadrature Amplitude Modulation (m-QAM). Complex modulation symbol sequences may be mapped to one or more transport layers by the layer mapper 1030. Modulation symbols of each transport layer may be mapped (precoded) to corresponding antenna port(s) by the precoder 1040. Outputs z of the precoder 1040 may be obtained by multiplying outputs y of the layer mapper 1030 by an N*M precoding matrix W. Herein, N is the number of antenna ports and M is the number of transport layers. The precoder 1040 may perform precoding after performing transform precoding (e.g., DFT) for complex modulation symbols. Alternatively, the precoder 1040 may perform precoding without performing transform precoding.

The resource mappers 1050 may map modulation symbols of each antenna port to time-frequency resources. The time-frequency resources may include a plurality of symbols (e.g., a CP-OFDMA symbols and DFT-s-OFDMA symbols) in the time domain and a plurality of subcarriers in the frequency domain. The signal generators 1060 may generate radio signals from the mapped modulation symbols and the generated radio signals may be transmitted to other devices through each antenna. For this purpose, the signal generators 1060 may include Inverse Fast Fourier Transform (IFFT) modules, Cyclic Prefix (CP) inserters. Digital-to-Analog Converters (DACs), and frequency up-converters.

Signal processing procedures for a signal received in the wireless device may be configured in a reverse manner of the signal processing procedures 1010 to 1060 of FIG. 17. For example, the wireless devices (e.g., 100 and 200 of FIG. 16) may receive radio signals from the exterior through the antenna ports/transceivers. The received radio signals may be converted into baseband signals through signal restorers. To this end, the signal restorers may include frequency downlink converters, Analog-to-Digital Converters (ADCs), CP remover, and Fast Fourier Transform (FFT) modules. Next, the baseband signals may be restored to codewords through a resource demapping procedure, a postcoding procedure, a demodulation processor, and a descrambling procedure. The codewords may be restored to original information blocks through decoding. Therefore, a signal processing circuit (not illustrated) for a reception signal may include signal restorers, resource demappers, a postcoder, demodulators, descramblers, and decoders.

Figure 18:
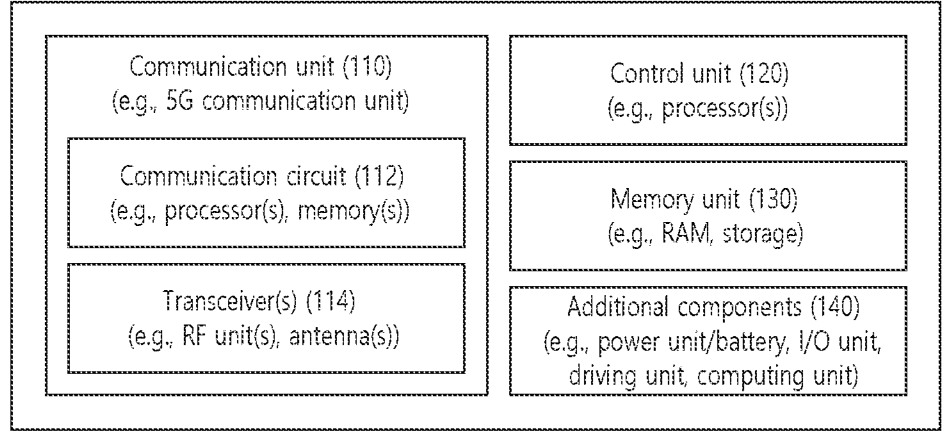
FIG. 18 shows another example of a wireless device, based on an embodiment of the present disclosure.

FIG. 18 shows another example of a wireless device, based on an embodiment of the present disclosure. The wireless device may be implemented in various forms according to a use-case/service (refer to FIG. 15). The embodiment of FIG. 18 may be combined with various embodiments of the present disclosure.

Referring to FIG. 18, wireless devices 100 and 200 may correspond to the wireless devices 100 and 200 of FIG. 16 and may be configured by various elements, components, units/portions, and/or modules. For example, each of the wireless devices 100 and 200 may include a communication unit 110, a control unit 120, a memory unit 130, and additional components 140. The communication unit may include a communication circuit 112 and transceiver(s) 114. For example, the communication circuit 112 may include the one or more processors 102 and 202 and/or the one or more memories 104 and 204 of FIG. 16. For example, the transceiver(s) 114 may include the one or more transceivers 106 and 206 and/or the one or more antennas 108 and 208 of FIG. 16. The control unit 120 is electrically connected to the communication unit 110, the memory 130, and the additional components 140 and controls overall operation of the wireless devices. For example, the control unit 120 may control an electric/mechanical operation of the wireless device based on programs/code/commands/information stored in the memory unit 130. The control unit 120 may transmit the information stored in the memory unit 130 to the exterior (e.g., other communication devices) via the communication unit 110 through a wireless/wired interface or store, in the memory unit 130, information received through the wireless/wired interface from the exterior (e.g., other communication devices) via the communication unit 110.

The additional components 140 may be variously configured according to types of wireless devices. For example, the additional components 140 may include at least one of a power unit/battery, input/output (I/O) unit, a driving unit, and a computing unit. The wireless device may be implemented in the form of, without being limited to, the robot (100*a* of FIG. 15), the vehicles (100*b*-1 and 100*b*-2 of FIG. 15), the XR device (100*c* of FIG. 15), the hand-held device (100*d* of FIG. 15), the home appliance (100*e* of FIG. 15), the IoT device (100*f* of FIG. 15), a digital broadcast terminal, a hologram device, a public safety device, an MTC device, a medicine device, a fintech device (or a finance device), a security device, a climate/environment device, the AI server/device (400 of FIG. 15), the BSs (200 of FIG. 15), a network node, etc. The wireless device may be used in a mobile or fixed place according to a use-example/service.

In FIG. 18, the entirety of the various elements, components, units/portions, and/or modules in the wireless devices 100 and 200 may be connected to each other through a wired interface or at least a part thereof may be wirelessly connected through the communication unit 110. For example, in each of the wireless devices 100 and 200, the control unit 120 and the communication unit 110 may be connected by wire and the control unit 120 and first units (e.g., 130 and 140) may be wirelessly connected through the communication unit 110. Each element, component, unit/portion, and/or module within the wireless devices 100 and 200 may further include one or more elements. For example, the control unit 120 may be configured by a set of one or more processors. As an example, the control unit 120 may be configured by a set of a communication control processor, an application processor, an Electronic Control Unit (ECU), a graphical processing unit, and a memory control processor. As another example, the memory 130 may be configured by a Random Access Memory (RAM), a Dynamic RAM (DRAM), a Read Only Memory (ROM)), a flash memory, a volatile memory, a non-volatile memory, and/or a combination thereof.

Hereinafter, an example of implementing FIG. 18 will be described in detail with reference to the drawings.

Figure 19:
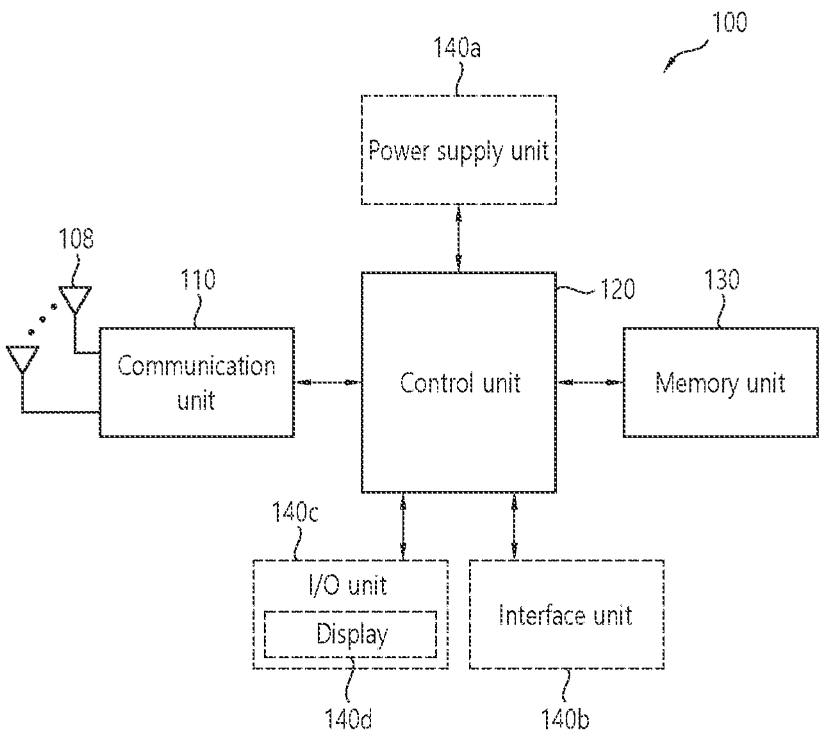
FIG. 19 shows a hand-held device, based on an embodiment of the present disclosure.

FIG. 19 shows a hand-held device, based on an embodiment of the present disclosure. The hand-held device may include a smartphone, a smartpad, a wearable device (e.g., a smartwatch or a smartglasses), or a portable computer (e.g., a notebook). The hand-held device may be referred to as a mobile station (MS), a user terminal (UT), a Mobile Subscriber Station (MSS), a Subscriber Station (SS), an Advanced Mobile Station (AMS), or a Wireless Terminal (WT). The embodiment of FIG. 19 may be combined with various embodiments of the present disclosure.

Referring to FIG. 19, a hand-held device 100 may include an antenna unit 108, a communication unit 110, a control unit 120, a memory unit 130, a power supply unit 140*a*, an interface unit 140*b*, and an I/O unit 140*c*. The antenna unit 108 may be configured as a part of the communication unit 110. Blocks 110 to 130/140*a* to 140*c* correspond to the blocks 110 to 130/140 of FIG. 18, respectively.

The communication unit 110 may transmit and receive signals (e.g., data and control signals) to and from other wireless devices or BSs. The control unit 120 may perform various operations by controlling constituent elements of the hand-held device 100. The control unit 120 may include an Application Processor (AP). The memory unit 130 may store data/parameters/programs/code/commands needed to drive the hand-held device 100. The memory unit 130 may store input/output data/information. The power supply unit 140*a* may supply power to the hand-held device 100 and include a wired/wireless charging circuit, a battery, etc. The interface unit 140*b* may support connection of the hand-held device 100 to other external devices. The interface unit 140*b* may include various ports (e.g., an audio I/O port and a video I/O port) for connection with external devices. The I/O unit 140*c* may input or output video information/signals, audio information/signals, data, and/or information input by a user. The I/O unit 140*c* may include a camera, a microphone, a user input unit, a display unit 140*d*, a speaker, and/or a haptic module.

As an example, in the case of data communication, the I/O unit 140*c* may acquire information/signals (e.g., touch, text, voice, images, or video) input by a user and the acquired information/signals may be stored in the memory unit 130. The communication unit 110 may convert the information/signals stored in the memory into radio signals and transmit the converted radio signals to other wireless devices directly or to a BS. The communication unit 110 may receive radio signals from other wireless devices or the BS and then restore the received radio signals into original information/signals. The restored information/signals may be stored in the memory unit 130 and may be output as various types (e.g., text, voice, images, video, or haptic) through the I/O unit 140*c*.

Figure 20:
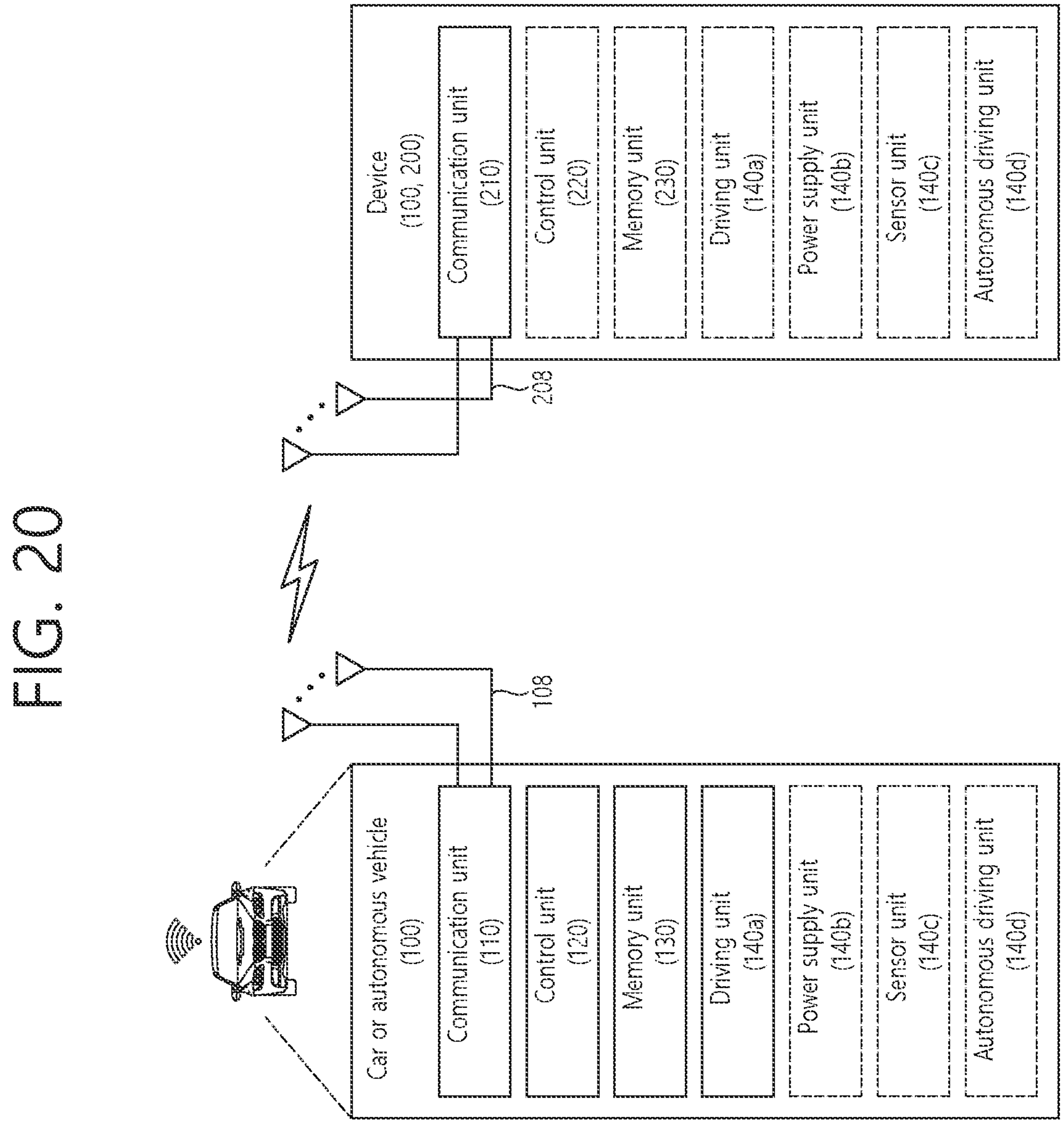
FIG. 20 shows a vehicle or an autonomous vehicle, based on an embodiment of the present disclosure.

FIG. 20 shows a vehicle or an autonomous vehicle, based on an embodiment of the present disclosure. The vehicle or autonomous vehicle may be implemented by a mobile robot, a car, a train, a manned/unmanned Aerial Vehicle (AV), a ship, etc. The embodiment of FIG. 20 may be combined with various embodiments of the present disclosure.

Referring to FIG. 20, a vehicle or autonomous vehicle 100 may include an antenna unit 108, a communication unit 110, a control unit 120, a driving unit 140*a*, a power supply unit 140*b*, a sensor unit 140*c*, and an autonomous driving unit 140*d*. The antenna unit 108 may be configured as a part of the communication unit 110. The blocks 110/130/140*a* to 140*d* correspond to the blocks 110/130/140 of FIG. 18, respectively.

The communication unit 110 may transmit and receive signals (e.g., data and control signals) to and from external devices such as other vehicles, BSs (e.g., gNBs and road side units), and servers. The control unit 120 may perform various operations by controlling elements of the vehicle or the autonomous vehicle 100. The control unit 120 may include an Electronic Control Unit (ECU). The driving unit 140*a* may cause the vehicle or the autonomous vehicle 100 to drive on a road. The driving unit 140*a* may include an engine, a motor, a powertrain, a wheel, a brake, a steering device, etc. The power supply unit 140*b* may supply power to the vehicle or the autonomous vehicle 100 and include a wired/wireless charging circuit, a battery, etc. The sensor unit 140*c* may acquire a vehicle state, ambient environment information, user information, etc. The sensor unit 140*c* may include an Inertial Measurement Unit (IMU) sensor, a collision sensor, a wheel sensor, a speed sensor, a slope sensor, a weight sensor, a heading sensor, a position module, a vehicle forward/backward sensor, a battery sensor, a fuel sensor, a tire sensor, a steering sensor, a temperature sensor, a humidity sensor, an ultrasonic sensor, an illumination sensor, a pedal position sensor, etc. The autonomous driving unit 140*d* may implement technology for maintaining a lane on which a vehicle is driving, technology for automatically adjusting speed, such as adaptive cruise control, technology for autonomously driving along a determined path, technology for driving by automatically setting a path if a destination is set, and the like.

For example, the communication unit 110 may receive map data, traffic information data, etc. from an external server. The autonomous driving unit 140*d* may generate an autonomous driving path and a driving plan from the obtained data. The control unit 120 may control the driving unit 140*a* such that the vehicle or the autonomous vehicle 100 may move along the autonomous driving path according to the driving plan (e.g., speed/direction control). In the middle of autonomous driving, the communication unit 110 may aperiodically/periodically acquire recent traffic information data from the external server and acquire surrounding traffic information data from neighboring vehicles. In the middle of autonomous driving, the sensor unit 140*c* may obtain a vehicle state and/or surrounding environment information. The autonomous driving unit 140*d* may update the autonomous driving path and the driving plan based on the newly obtained data/information. The communication unit 110 may transfer information about a vehicle position, the autonomous driving path, and/or the driving plan to the external server. The external server may predict traffic information data using AI technology, etc., based on the information collected from vehicles or autonomous vehicles and provide the predicted traffic information data to the vehicles or the autonomous vehicles.

Claims in the present description can be combined in a various way. For instance, technical features in method claims of the present description can be combined to be implemented or performed in an apparatus, and technical features in apparatus claims can be combined to be implemented or performed in a method. Further, technical features in method claim(s) and apparatus claim(s) can be combined to be implemented or performed in an apparatus. Further, technical features in method claim(s) and apparatus claim(s) can be combined to be implemented or performed in a method.

What is claimed is:

1. A method comprising:

obtaining, by a device, a media access control (MAC) protocol data unit (PDU);

determining, by the device, a priority value related to the MAC PDU;

triggering, by the device, resource selection in a slot;

determining, by the device, candidate slots within a selection window related to the slot;

monitoring, by the device, slots related to the candidate slots;

determining, by the device, candidate resources within the candidate slots based on the monitoring; and selecting, by the device, a plurality of resources from the candidate resources, wherein, based on that the priority value is less than or equal to a threshold priority value, a time interval between the plurality of resources is determined to be greater than or equal to a threshold time interval.

2. The method of claim 1, wherein the threshold priority value is configured for a resource pool.

3. The method of claim 1, wherein, based on that the priority value is less than or equal to the threshold priority value, the device selects the plurality of resources such that the time interval between the plurality of resources is greater than or equal to the threshold time interval.

4. The method of claim 1, wherein, based on that the priority value is greater than the threshold priority value, the time interval between the plurality of resources is determined regardless of the threshold time interval.

5. The method of claim 1, wherein the time interval between the plurality of resources is determined based on a resource selection method of the first device.

6. The method of claim 1, wherein, based on that a resource selection method is a partial sensing-based resource selection method or a random selection-based resource selection method, the time interval between the plurality of resources is determined to be less than or equal to the threshold time interval.

7. The method of claim 6, wherein the threshold time interval is configured to be greater than or equal to a hybrid automatic repeat request (HARQ) round-trip time (RTT) time.

8. The method of claim 1, wherein, based on that the time interval between the plurality of resources is less than or equal to the threshold time interval, HARQ feedback is enabled for transmission on a last resource of the plurality of resources, and HARQ feedback is disabled for transmission on remaining resources of the plurality of resources.

9. The method of claim 8, wherein the plurality of resources are included in a resource group for same transport block (TB) transmission.

10. The method of claim 1, wherein, based on that a number of the candidate slots is less than or equal to a minimum number of candidate slots, the plurality of resources are selected based on random selection from a resource pool or an exceptional resource pool.

11. The method of claim 1, wherein, based on that a number of candidate slots in which a result of partial sensing is available among the candidate slots is less than or equal to a minimum number of candidate slots, the plurality of resources are selected based on random selection from a resource pool or an exceptional resource pool.

12. The method of claim 1, wherein a time interval between an initial resource and a last resource among the plurality of resources is selected to be less than or equal to a value of a discontinuous reception (DRX) retransmission timer configured for the device or a receiving device related to the device.

13. A device, comprising:

at least one transceiver;

at least one processor; and at least one memory connected to the at least one processor and storing instructions that, based on being executed, cause the device to perform operations comprising:

obtaining a media access control (MAC) protocol data unit (PDU);

determining a priority value related to the MAC PDU;

triggering resource selection in a slot;

determining candidate slots within a selection window related to the slot;

monitoring slots related to the candidate slots;

determining candidate resources within the candidate slots based on the monitoring; and selecting a plurality of resources from the candidate resources, wherein, based on that the priority value is less than or equal to a threshold priority value, a time interval between the plurality of resources is determined to be greater than or equal to a threshold time interval.

14. The device of claim 13, wherein the threshold priority value is configured for a resource pool.

15. The device of claim 13, wherein, based on that the priority value is less than or equal to the threshold priority value, the device selects the plurality of resources such that the time interval between the plurality of resources is greater than or equal to the threshold time interval.

16. A processing device, comprising:

at least one processor; and at least one memory connected to the at least one processor and storing instructions that, based on being executed, cause a device to perform operations comprising:

obtaining a media access control (MAC) protocol data unit (PDU);

determining a priority value related to the MAC PDU;

triggering resource selection in a slot;

determining candidate slots within a selection window related to the slot;

monitoring slots related to the candidate slots;

determining candidate resources within the candidate slots based on the monitoring; and selecting a plurality of resources from the candidate resources, wherein, based on that the priority value is less than or equal to a threshold priority value, a time interval between the plurality of resources is determined to be greater than or equal to a threshold time interval.

17. The processing device of claim 16, wherein the threshold priority value is configured for a resource pool.

18. The processing device of claim 16, wherein, based on that the priority value is less than or equal to the threshold priority value, the device selects the plurality of resources such that the time interval between the plurality of resources is greater than or equal to the threshold time interval.

* * * * *